US012615151B2

(12) United States Patent
Rand

(10) Patent No.: US 12,615,151 B2
(45) Date of Patent: Apr. 28, 2026

(54) COMPUTER IMPLEMENTED SYSTEM AND METHOD

(71) Applicant: nChain Licensing AG, Zug (CH)

(72) Inventor: Ricky Charles Rand, London (GB)

(73) Assignee: nChain Licensing AG, Zug (CH)

( * ) Notice: Subject to any disclaimer, the term of this patent is extended or adjusted under 35 U.S.C. 154(b) by 111 days.

(21) Appl. No.: 18/579,264

(22) PCT Filed: Aug. 1, 2022

(86) PCT No.: PCT/EP2022/071595
§ 371 (c)(1),
(2) Date: Jan. 12, 2024

(87) PCT Pub. No.: WO2023/012127
PCT Pub. Date: Feb. 9, 2023

(65) Prior Publication Data
US 2024/0323018 A1 Sep. 26, 2024

(30) Foreign Application Priority Data
Aug. 3, 2021 (GB) ....................................... 2111189

(51) Int. Cl.
*H04L 29/06* (2006.01)
*H04L 9/00* (2022.01)
*H04L 9/32* (2006.01)

(52) U.S. Cl.
CPC .............. *H04L 9/3213* (2013.01); *H04L 9/50* (2022.05)

(58) Field of Classification Search
CPC ................................ H04L 9/3213; H04L 9/50
See application file for complete search history.

(56) References Cited

U.S. PATENT DOCUMENTS

2004/0073518 A1* 4/2004 Atkinson ........... G06Q 20/3825
705/65
2007/0266244 A1* 11/2007 Walker .................. H04L 9/3271
713/168
(Continued)

FOREIGN PATENT DOCUMENTS

WO 2021165814 A2 8/2021
WO 2021165815 A1 8/2021
(Continued)

OTHER PUBLICATIONS

GB2111189.3 Combined Search and Abbreviated Examination Report dated Dec. 15, 2021, 6 pages.
(Continued)

*Primary Examiner* — Evans Desrosiers
(74) *Attorney, Agent, or Firm* — Galvani Smith PLLC

(57) ABSTRACT

Computer implemented systems and methods are detailed for establishing delegated authorisation. The methods of verification and generation of delegated authorisation tokens comprise obtaining a first delegated authorisation token of a chain of delegated authorisation tokens. Further delegated authorisation tokens of the chain of delegated authorisation tokens are generated based on the preceding delegated authorisation token in the chain of delegated authorisation tokens. If verifying the validity of a delegated authorisation token, the validity of the first delegated authorisation token based on a comparison of one of the delegated authorisation tokens in the chain of delegated authorisation tokens and a predetermined value.

17 Claims, 13 Drawing Sheets

(56)        References Cited

U.S. PATENT DOCUMENTS

| | | | |
|---|---|---|---|
| 2015/0161597 | A1* | 6/2015 | Subramanian ....... G06Q 20/204 705/41 |
| 2021/0218575 | A1 | 7/2021 | Wright |

FOREIGN PATENT DOCUMENTS

| | | | |
|---|---|---|---|
| WO | 2021165816 | A1 | 8/2021 |
| WO | 2021165848 | A1 | 8/2021 |
| WO | 2021165907 | A1 | 8/2021 |

OTHER PUBLICATIONS

PCT/EP2022/071595 International Search Report and Written Opinion dated Nov. 29, 2022, 11 pages.

* cited by examiner

| TxID_0 | |
|---|---|
| Input(s) | Output(s) |
| Input <br> • Pointer to previous $Tx$ <br> • Index of UTXO in previous $Tx$ <br> • Unlocking script for unlocking from previous party | $\underline{UTXO_0}$ <br> • Amount <br> • Locking script locking to Alice |
| • <br> • <br> • <br> <br> Optional further inputs <br> • <br> • <br> • | • <br> • <br> • <br> <br> Optional further $UTXOs$ <br> • <br> • <br> • |

203

152j $Tx_1$    201    203

202

| TxID_1 | |
|---|---|
| Input(s) | Output(s) |
| Input <br> • Pointer to $Tx_0$ <br> • Index of $UTXO_0$ [within $Tx_0$] <br> • Unlocking script for unlocking $UTXO_0$ from Alice | $\underline{UTXO_1}$ <br> • Amount <br> • Locking script locking to Bob |
| • <br> • <br> <br> Optional further inputs <br> • <br> • <br> • | • <br> • <br> • <br> <br> Optional further $UTXOs$ <br> • <br> • <br> • |

Transaction
from Alice to Bob

Validated by running: Alice's locking script (from output of $Tx_0$), together with Bob's unlocking script (as input to $Tx_1$). This checks that Bob's unlocking script in $Tx_1$ meets the condition(s) defined in Alice's locking script in $Tx_0$.

FIG. 5

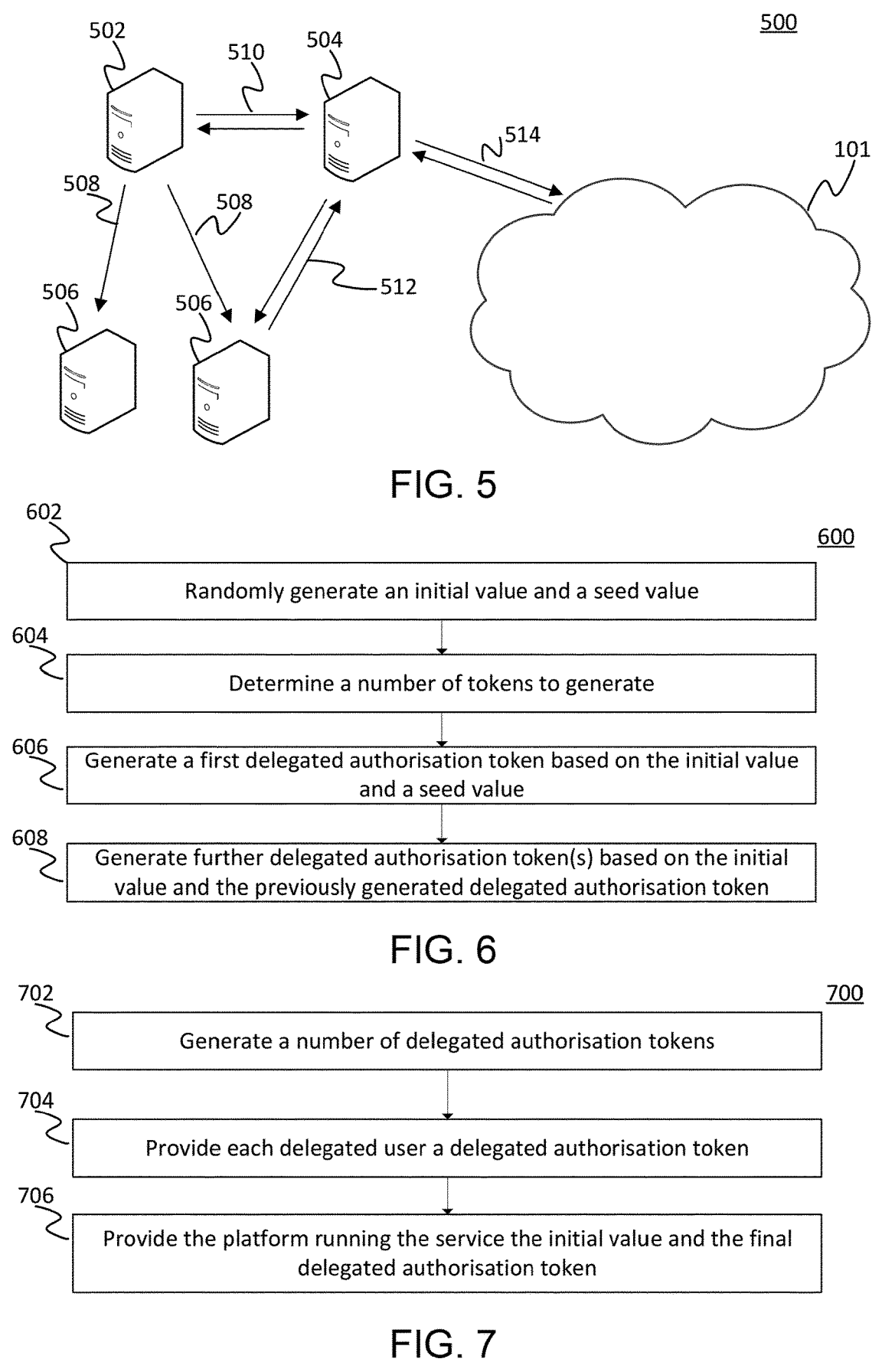

| 602 | 600 |
| --- | --- |

| Randomly generate an initial value and a seed value |
| --- |

604

| Determine a number of tokens to generate |
| --- |

606

| Generate a first delegated authorisation token based on the initial value and a seed value |
| --- |

608

| Generate further delegated authorisation token(s) based on the initial value and the previously generated delegated authorisation token |
| --- |

| Generate a number of delegated authorisation tokens |
| --- |

704

| Provide each delegated user a delegated authorisation token |
| --- |

706

| Provide the platform running the service the initial value and the final delegated authorisation token |
| --- |

FIG. 7

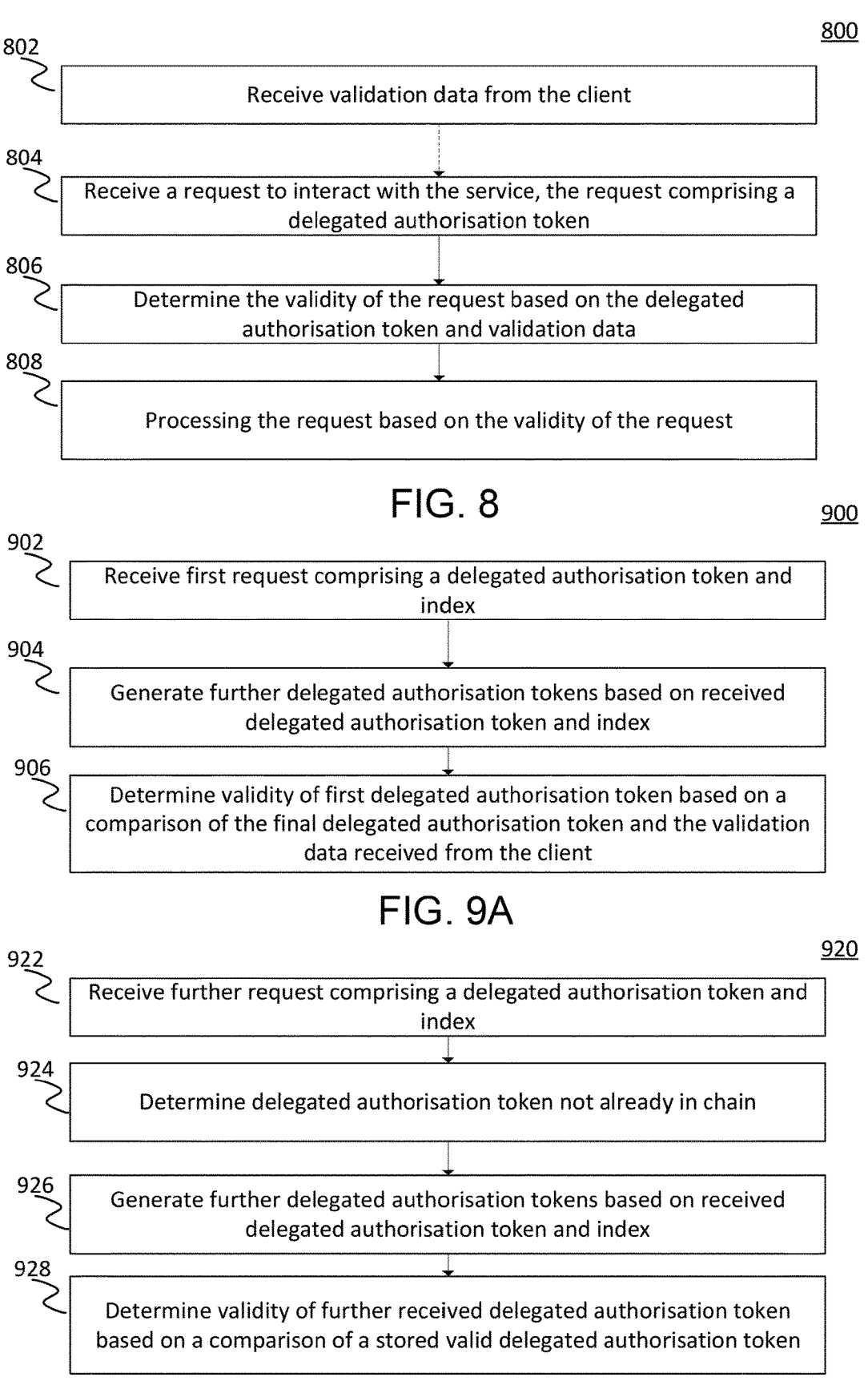

800

802 Receive validation data from the client

804 Receive a request to interact with the service, the request comprising a delegated authorisation token 806 Determine the validity of the request based on the delegated authorisation token and validation data 808 Processing the request based on the validity of the request

902 Receive first request comprising a delegated authorisation token and index

904 Generate further delegated authorisation tokens based on received delegated authorisation token and index 906 Determine validity of first delegated authorisation token based on a comparison of the final delegated authorisation token and the validation data received from the client

922 Receive further request comprising a delegated authorisation token and index 924 Determine delegated authorisation token not already in chain 926 Generate further delegated authorisation tokens based on received delegated authorisation token and index 928 Determine validity of further received delegated authorisation token based on a comparison of a stored valid delegated authorisation token

COMPUTER IMPLEMENTED SYSTEM AND METHOD

CROSS REFERENCE TO RELATED APPLICATIONS

This application is the U.S. National Stage of International Application No. PCT/EP2022/071595 filed on Aug. 1, 2022, which claims the benefit of United Kingdom Patent Application No. 2111189.3, filed on Aug. 3, 2021, the contents of which are incorporated herein by reference in their entireties.

FIELD

The present disclosure relates to methods and systems for implementing a platform of one or more services associated with a distributed ledger, i.e. a blockchain, for one or more clients. More particularly, the present disclosure provides, but is not limited to, the provision of delegated access to services associated with a blockchain.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Coinbase transactions are discussed below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at a node, and the publication of blocks can be achieved through the publication of mere block headers.

The transactions in the blockchain are used to perform one or more of the following: to convey a digital asset (i.e. a number of digital tokens), to order a set of journal entries in a virtualised ledger or registry, to receive and process timestamp entries, and/or to time-order index pointers. A blockchain can also be exploited in order to layer additional functionality on top of the blockchain. Blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in detail below. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the block-chain.

The above-mentioned examples or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and have access to BSV libraries. Thus, not only do clients need to include processing to implement such functionality, but they also need to ensure that appropriate security measures are implemented for such processes before they can make use of a blockchain network to send, receive, and view data, and/or digital assets, which relate to a smart contract or a token representing a real world asset transaction.

SUMMARY OF THE INVENTION

According to a first aspect, there is provided a computer implemented method comprising: obtaining a predetermined value, receiving a request, the request comprising a first delegated authorisation token of a chain of delegated authorisation tokens, generating further delegated authorisation tokens of the chain of delegated authorisation tokens, wherein the generation of each further delegated authorisation token in the chain of delegated authorisation tokens is based on a preceding delegated authorisation token in the chain of delegated authorisation tokens, determining a validity of the first delegated authorisation token based on a comparison of one of the delegated authorisation tokens in the chain of delegated authorisation tokens and the predetermined value.

According to a second aspect, there is provided a computer implemented method comprising for generating a chain of delegated authorisation tokens associated comprising: obtaining a first value and a second value, generating a first delegated authorisation token of the chain of delegated authorisation tokens, the first delegated authorisation token is based on the first value and the second value, and generating at least one further delegated authorisation token of the chain of delegated authorisation tokens, wherein generation of each further delegated authorisation token in the chain of delegated authorisation tokens is based on the preceding delegated authorisation token in the chain of delegated authorisation tokens and the first value.

According to a third aspect, there is provided a method of validating the tokens according to the first aspect, and where the first delegated authorisation token has been generated by a client according to the second aspect.

According to fourth aspect, there is provided a method comprising the steps of: receiving a delegated authorisation token generated according to the method of the second aspect, generating a request comprising the delegated authorisation token, and sending the request to a server.

According to fifth aspect, there is provided a system comprising: a server, a delegate, and a client configured to: generate, according to the second aspect, a chain of delegated authorisation tokens and a first value, transmit the first value and a final delegated authorisation token of the chain of delegated authorisation tokens to the server, and transmit one of the delegated authorisation tokens in the chain of delegated authorisation tokens to the delegate.

Some specific components and embodiments of the disclosed method are now described by way of illustration with reference to the accompanying drawings, in which like reference numerals refer to like features.

BRIEF DESCRIPTION OF THE FIGURES

FIG. 2 illustrates an example transaction protocol.

FIG. 5 is a schematic diagram illustrating interactions between a platform processor, database, blockchain network, client and delegates.

FIG. 6 illustrates a method for generating delegated authorisation tokens.

FIG. 7 illustrates a method for distributing the information required for delegates to interact with a service.

FIG. 8 illustrates a method for validating delegated authorisation tokens.

FIGS. 9A-D illustrate examples and embodiments relating to validating delegated authorisation tokens.

DETAILED DESCRIPTION

Figure 1:
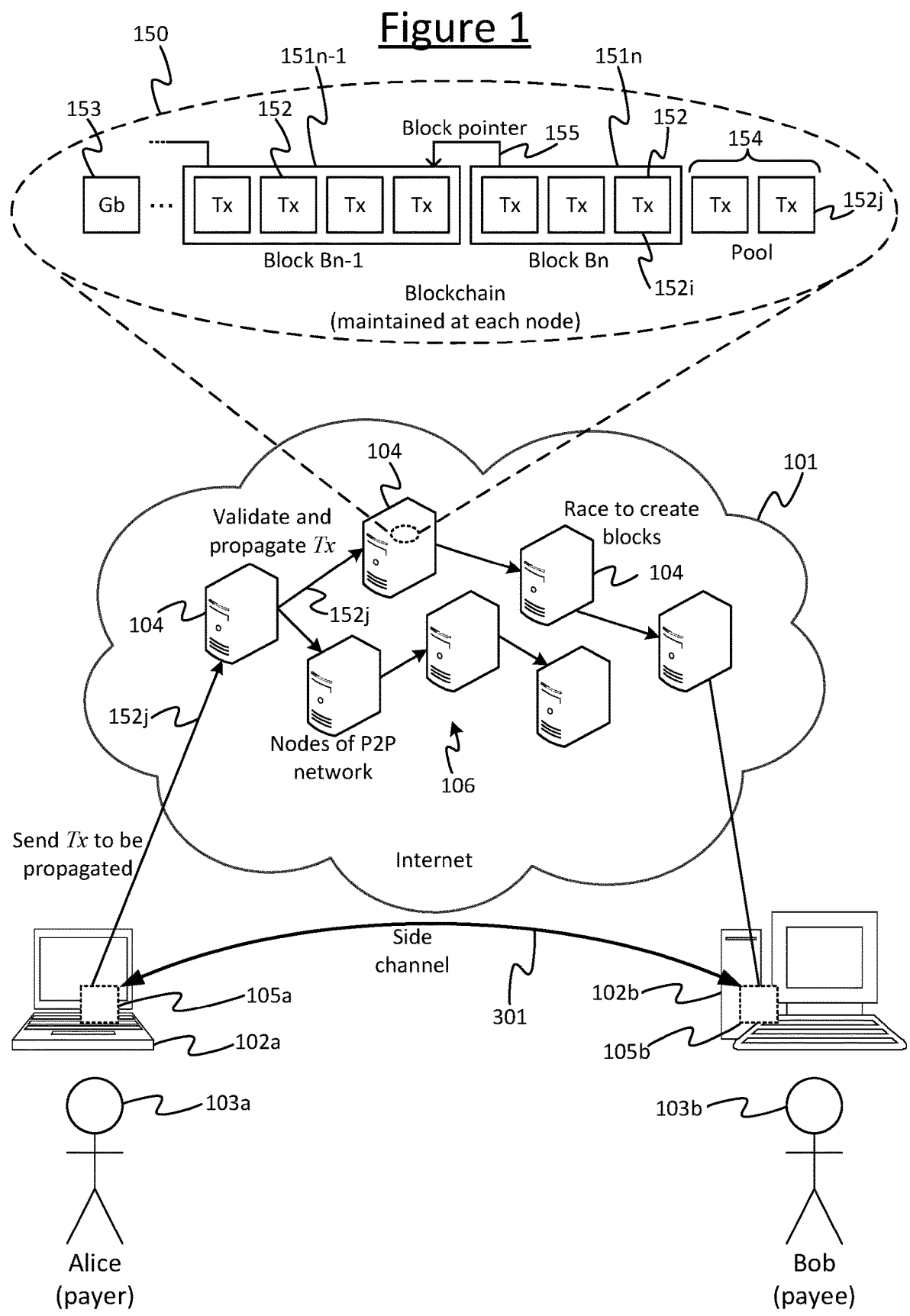
FIG. 1 depicts an example system for implementing a blockchain.

Accordingly, there is a desire to implement secure, low-complexity, user-friendly, efficient, and robust techniques, that will allow any client, whether computationally sophisticated or not, to be able to instantaneously access and interact with useful applications associated with the block-chain, in a simple, fast, accurate, reliable, and secure manner, that is computationally and functionally less onerous. More particularly, there is a desire to allow client approved delegates to also benefit from such a system in a preferably secure, reliable, and/or revokable manner.

Such an improved solution has now been devised. The present disclosure addresses the above technical concerns by proposing one or more techniques whereby data may be simply, securely, and/or instantaneously written into, or obtained from the blockchain by users that have delegated authorisation (and/or possess a delegated authorisation token) for writing, reading, or other acts associated with the blockchain. Methods, devices, and systems which provide an application programming interface (API) for one or more services associated with a blockchain (and in particular the delegation of these services), without such clients needing to implement any processing or functionality for using the blockchain, nor any processing or functionality for user management, while still being able to avail all advantages associated with the blockchain and delegated authorisation thereof.

According to a first aspect, there is provided a computer implemented method comprising: obtaining a predetermined value, receiving a request, the request comprising a first delegated authorisation token of a chain of delegated authorisation tokens, generating further delegated authorisation tokens of the chain of delegated authorisation tokens, wherein the generation of each further delegated authorisation token in the chain of delegated authorisation tokens is based on a preceding delegated authorisation token in the chain of delegated authorisation tokens, determining a validity of the first delegated authorisation token based on a comparison of one of the delegated authorisation tokens in the chain of delegated authorisation tokens and the predetermined value.

The device or devices undertaking the method of the first aspect can be considered a validator as it is validating delegated authorisation tokens. Advantageously, with only the predetermined value provided to the validator, the validator can still validate any received delegated authorisation tokens thus providing a secure authentication system that requires minimal data sharing and therefore smaller attack surface. The smaller attack surface meaning an overall higher security system. Advantageously, the validator does not need to know the number or identity of any delegated user they are validating thereby providing better privacy for the client and delegates.

Optionally, the generation is based on hashing the preceding delegated authorisation token in the chain of delegated authorisation tokens.

Optionally, the step of generating further delegated authorisation tokens of the chain of delegated authorisation tokens, comprises for each further delegated authorisation token conducting the steps of: determining an intermediate preimage, the intermediate preimage being based on the preceding delegated authorisation token in the chain of delegated authorisation tokens, and applying a one-way function to the intermediate preimage, the output to the one-way function being the further delegated authorisation token. Preferably, the one-way function is a hashing function. Preferably, the intermediate preimage is additionally based on a given value.

Advantageously, determining delegated authorisation tokens using a one-way function means that any member of the system cannot calculate any delegated authorisation tokens higher up the chain from their current one.

Advantageously, by basing the preimage on a given value (described as an initial value below), without said given value, no member of the system can calculate any other delegated authorisation tokens higher up the chain. Said given value is not provided to any other devices than the device running the method of the first embodiment thereby increasing tamper resistance and resilience to attacks by malign parties.

Optionally, the generation of further delegated authorisation tokens is based on the preceding delegated authorisation token in the chain of delegated authorisation tokens and a given value.

Optionally, the method further comprises the step of obtaining the given value from a storage. Optionally, the given value was received from a client.

Optionally, the generation is based on a concatenation of the given value and the preceding delegated authorisation token. Preferably, the generation is based on hashing the concatenation of the given value and the preceding delegated authorisation token in the chain of delegated authorisation tokens.

Advantageously, the combination of a one-way function and of the use of a given value disallows a user with a delegated authorisation token to calculate any other delegated authorisation tokens in the chain of delegated authorisation tokens (thereby providing extra security) while still enabling the validating service to validate delegated authorisation tokens without needing to be sent all of the valid tokens. By removing the need for a client or other device send valid tokens to the validator running the method according to this first aspect, the chance of third parties to obtain any valid tokens is again reduced and the security of the overall system is improved.

Optionally, the request further comprises an index number and the number of delegated authorisation tokens in the chain of delegated authorisation tokens is based on the index number. Optionally, the index may represent the distance from a client generated final delegated authorisation token.

Where the index is used and provided for a delegate to include in their requests, there is provided a higher-security system which requires adversarial third parties to know two pieces of information: the hash and the index. Both must be correct for a service to process the request.

Alternatively, no index is used. Where the index isn't used or provided to a delegate, advantageously, clients do not know where they are in the chain so cannot identify how many other delegates there are thereby increasing the privacy for all clients and users being validated.

Optionally, the step of determining a validity of the first delegated authorisation token is based on a comparison of a final delegated authorisation tokens in the chain of delegated authorisation tokens and the predetermined value.

Optionally, the step of determining the validity of the first delegated authorisation token comprises: comparing the final delegated authorisation token in the chain of delegated authorisation tokens and the predetermined value have the same value.

Optionally, the request is to submit to or to read from a/the blockchain.

Optionally, the request is to submit data to a blockchain based data recordal service such that a representation of data comprised in the request is recorded on a/the blockchain. Additionally or alternatively, the request is to read a representation of data from a/the blockchain based data recordal service. Preferably the request to read data comprises a reference to the data to be read. Preferably, the blockchain based data recordal service is part of a Platform Services as described herein.

Advantageously, the blockchain based data recordal service provides a way to simplify the usage of the blockchain as a commodity data ledger. Further, the delegated authorisation tokens provide enhanced security to the blockchain based data recordal service. Thus, delegated users of the blockchain based data recordal service are able to interact with the blockchain and take advantage of the blockchain characteristics (such as immutability, distributed, optional transparency, traceability, etc) for their data storage needs in a secure manner while not necessarily requiring direct interaction with transactions or the blockchain itself.

Optionally, determining the validity of the request is further based on a number of requests previously received that comprised the same first delegated authorisation token.

Advantageously, this enables a client finer grained control over the system and to limit the ability for bad actors to spam. Or if a nefarious third party were to obtain a valid delegated authorisation token, a limit is placed on the damage that could be done thereby increasing the security of the overall system.

Preferably, the predetermined value is a client generated delegated authorisation token. Preferably, the predetermined value is the last delegated authorisation token in a client generated chain of delegated authorisation tokens. Preferably, the predetermined value is stored in a stored chain of delegated authorisation tokens upon reception.

Optionally, the method further comprises the step of storing the chain of delegated authorisation tokens based on the validity of the first delegated authorisation token. Preferably, the method further comprises the steps of: receiving a further request comprising a further delegated authorisation token, determining a validity of the further delegated authorisation token based whether the further delegated authorisation token is present in the stored chain of delegated authorisation tokens.

The intermediate hash results are recorded advantageously reduce processing time for subsequent verifications. If a token is received with a lower index (i.e. closer to the final delegated authorisation token or $H_0$) than one already received, then no hashing needs to be conducted and computer processing time and power is saved.

Optionally, the predetermined value is a delegated authorisation token with the highest index of a/the stored chain of delegated authorisation tokens. Preferably, the step of generating further delegated authorisation tokens is conducted until the Optionally, the method further comprises: determining a highest index of the stored chain of delegated authorisation tokens, generating further delegated authorisation tokens based on the received delegated authorisation token until a delegated authorisation token with an index equal to the highest index is generated, determining the validity of the received delegated authorisation token based on a comparison of the final generated delegated authorisation token with the stored delegated authorisation token with the highest index.

Optionally, where each delegated authorisation token has an index associated with it, where in the index may represent the distance from the final delegated authorisation token, each delegated authorisation token is stored with its associated index and preferably can be searched by the index. By storing each delegated authorisation token by its index, advantageously, searching for the presence of any tokens becomes more time and computer resource efficient as searching by an index and/or searching at an index is quicker and less computing resource intensive than iterating through a dataset and comparing each value.

Optionally, the method further comprises the step of providing an indication of the validity of the request and/or processing the request based on the validity of the delegated authorisation token. Preferably, processing means any one or more of the following: forwarding the request, dropping the request, allowing the request, blocking the request, allowing access to a blockchain based storage system, allowing read access to the blockchain based storage system, allowing write access to the blockchain based storage system, providing data from the blockchain based storage system based on the request, and/or writing data to the blockchain based storage system based on the request.

According to a second aspect, there is provided a computer implemented method comprising for generating a chain of delegated authorisation tokens associated comprising: obtaining a first value and a second value, generating a first delegated authorisation token of the chain of delegated authorisation tokens, the first delegated authorisation token is based on the first value and the second value, and generating at least one further delegated authorisation token of the chain of delegated authorisation tokens, wherein the generation of each further delegated authorisation token in the chain of delegated authorisation tokens is based on the preceding delegated authorisation token in the chain of delegated authorisation tokens and the first value.

The device or devices undertaking the method according to the second aspect will usually be the client where the client is delegating it's access to delegates or delegated users.

Optionally, the step of generating further delegated authorisation tokens of the chain of delegated authorisation tokens, comprises for each further delegated authorisation token conducting the steps of: determining an intermediate preimage, the intermediate preimage being based on the preceding delegated authorisation token in the chain of delegated authorisation tokens and the first value, and applying a one-way function to the intermediate preimage, the output to the one-way function being the further delegated authorisation token. Preferably, the one-way function is a hashing function. Preferably, the intermediate preimage is additionally based on a given value.

This method provides the same or similar advantages relating to security and more as are discussed in relation to the first aspect.

Preferably, the generation is based on hashing the concatenation of the given value and the preceding delegated authorisation token in the chain of delegated authorisation tokens.

Optionally, the method further comprises the step of providing one of the delegated authorisation tokens of the chain of delegated authorisation tokens to a delegate device. Preferably, the delegate device is further provided an index of the delegated authorisation token, the index representing where the provided delegated authorisation token is in the chain of delegated authorisation tokens.

Optionally, the method further comprising the step of providing the first value and a final delegated authorisation token of the chain of delegate authorisation tokens to a verification device. Preferably, the verification device is further provided a number indicative of a maximum number of reads or writes per delegate.

Optionally, the number of delegated authorisation tokens in the chain of delegated authorisation tokens is based on the number of delegates. Preferably, the number of delegated authorisation tokens in the chain of delegated authorisation tokens is equal to the number of delegates.

As set out above with respect to the first aspect, optionally, the delegated authorisation tokens are provided to delegates such that the delegates can interact (preferably by way of writing data to or reading data from a blockchain based data recordal service).

Thus, the same or similar advantages apply whereby, the delegated authorisation tokens above provide enhanced security when accessing the blockchain based data recordal service. Thus, delegated users of the blockchain based data recordal service are able to interact with the blockchain and take advantage of the blockchain characteristics (such as immutability, distributed, optional transparency, traceability, etc) for their data storage needs in a secure manner while not necessarily requiring direct interaction with transactions or the blockchain itself.

Optionally, the second value is deleted after the first delegated authorisation token is generated.

Advantageously, by deleting the second value, no one is able to construct the first delegated authorisation token and therefore not the whole chain thereby providing improved security by removing any opportunity for malicious third parties to re-generate tokens.

Optionally, the first and second values are randomly generated.

Preferably, the preceding delegated authorisation token of the first or second aspect refers to the delegated authorisation token immediately preceding the delegated authorisation token being generated. This may also be the latest delegated authorisation token that was generated or obtained.

According to a third aspect, there is provided a method of validating the tokens according to the first aspect, and where the first delegated authorisation token has been generated by a client according to the second aspect.

According to fourth aspect, there is provided a method comprising the steps of: receiving a delegated authorisation token generated according to the method of the second aspect, generating a request comprising the delegated authorisation token, and sending the request to a server.

According to fifth aspect, there is provided a system comprising: a server, a delegate, and a client configured to: generate, according to the second aspect, a chain of delegated authorisation tokens and a first value, transmit the first value and a final delegated authorisation token of the chain of delegated authorisation tokens to the server, and transmit one of the delegated authorisation tokens in the chain of delegated authorisation tokens to the delegate.

Optionally, the server is configured to receive and process a request from the delegate according the method of the first aspect.

According to any one or more of the preceding aspects, optionally, the requests are received via or using the HTTPS protocol from a client and/or delegated user. Additionally or alternatively, the receiver of the requests is implementing and API as a webservice. Optionally, the delegated authorisation tokens are configured to provide delegated access to event streams and/or data writer services. Advantageously, use of HTTPS and/or an API and/or a web service provides complementary security features while still enabling the receiver of the web request to provide flexible blockchain based data services. Further advantages of providing delegated access to a blockchain based data writer or reader include allowing (in a secure manner) a greater number of users beyond just the first client to have access to the blockchain based data writer or reader services.

Example System Overview

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 160. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction 152*j*, then the entity sends the new transaction from its computer terminal 102 to a recipient. The entity or the recipient will eventually send this transaction to one or more of the blockchain nodes 104 of the network 106 (which nowadays are typically servers or data centres, but could in principle be other user terminals). It is also not excluded that the entity 103 enacting the new transaction 152*j* could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the entity 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned is whether it has yet been validly redeemed by the input of another, onward transaction 152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151n and in which order, and the current set 154 of unpublished transactions is updated. The blockchain nodes 104 then continue to race to create a block from the newly defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions 154, but whoever gets there first will define the ordered set of transactions that are included in the latest block 151. Eventually a blockchain node 104 will solve the puzzle for a part of the ordered set 154 which includes Alice's transaction 152j). Once the proof-of-work has been done for the ordered set 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model.

In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol.

However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "Tx". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of Tx comprises a pointer pointing back to Tx; (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

$$< Sig\ P_A > \ < P_A > \ || \ [Checksig\ P_A]$$

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered set of transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node that publishes her transaction 104. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_0$, then the difference may be assigned by the node 104 that publishes the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102a, 120b, respectively, may comprise additional communication functionality. This additional functionality enables Alice 103a to establish a separate side channel 301 with Bob 103b (at the instigation of either party or a third party). The side channel 301 enables exchange of data separately from the blockchain network. Such communication is sometimes referred to as "off-chain"

communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 301 may be used to exchange any other transaction related data, such as keys, negotiated amounts or terms, data content, etc.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 301 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 3A:
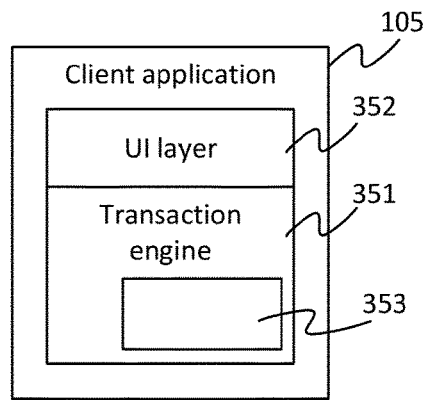
FIGS. 3A and 3B illustrate an example implementation of the client application and its user interface.

FIG. 3A illustrates an example implementation of the client application 105 for implementing embodiments of the presently disclosed scheme. The client application 105 comprises a transaction engine 351 and a user interface (UI) layer 352. The transaction engine 351 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 351 of each client 105 comprises a function 353 . . . .

The UI layer 352 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application

105, this is not necessarily limiting and instead they could be implemented in a suite of two or more distinct applications, e.g. one being a plug-in to the other or interfacing via an API (application programming interface). For instance, the functionality of the transaction engine 351 may be implemented in a separate application than the UI layer 352, or the functionality of a given module such as the transaction engine 351 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
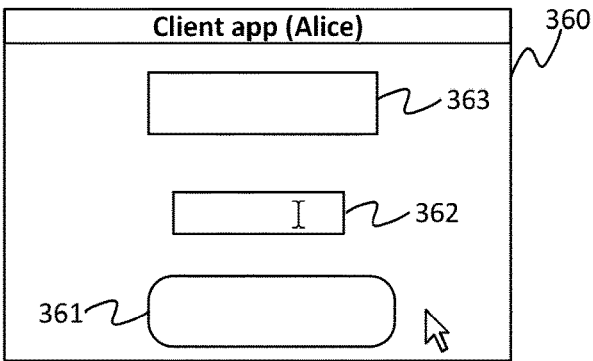

FIG. 3B gives a mock-up of an example of the user interface (UI) 360 which may be rendered by the UI layer 352 of the client application 105a on Alice's equipment 102a. It will be appreciated that a similar UI may be rendered by the client 105b on Bob's equipment 102b, or that of any other party.

By way of illustration FIG. 3B shows the UI 360 from Alice's perspective. The UI 360 may comprise one or more UI elements 362, 362, 363 rendered as distinct UI elements via the user output means.

For example, the UI elements may comprise one or more user-selectable elements 362 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 362, through which the user can . . . . These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 363 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 360 shown in FIG. 3 is only a schematized mock-up and in practice it may comprise one or more further UI elements, which for conciseness are not illustrated.

Node Software

Figure 4:
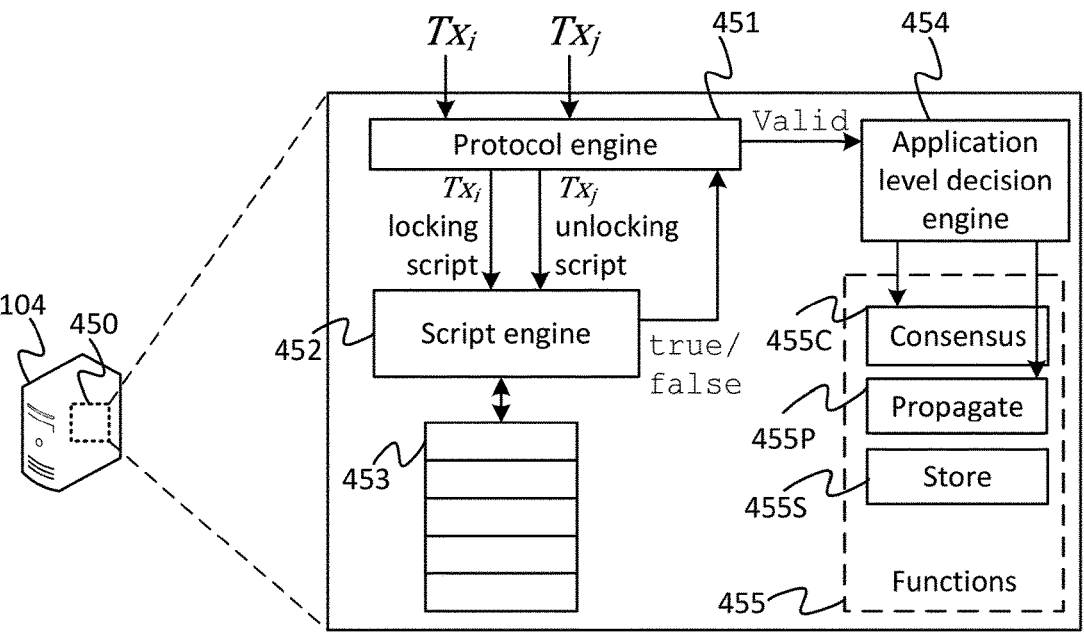
FIG. 4 illustrates an example of the node software that is run on each blockchain node of the network.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-ofwork), a propagation module 455P and a storage module 455S (for example, a database). The protocol engine 351 is typically configured to recognize the different fields of a transaction 152 and process them in accordance with the node protocol. When a transaction 152*j* (Tx$_j$) is received having an input pointing to an output (e.g. UTXO) of another, preceding transaction 152*i* (Tx$_{m-1}$), then the protocol engine 451 identifies the unlocking script in Tx$_j$ and passes it to the script engine 452. The protocol engine 451 also identifies and retrieves Tx$_i$ based on the pointer in the input of Tx$_j$. Tx$_i$ may be published on the blockchain 150, in which case the protocol engine may retrieve Tx$_i$ from a copy of a block 151 of the blockchain 150 stored at the node 104. Alternatively, Tx$_i$ may yet to have been published on the blockchain 150. In that case, the protocol engine 451 may retrieve Tx$_i$ from the ordered set 154 of unpublished transactions maintained by the node 104. Either way, the script engine 451 identifies the locking script in the referenced output of Tx$_i$ and passes this to the script engine 452.

The script engine 452 thus has the locking script of Tx; and the unlocking script from the corresponding input of Tx$_j$. For example, transactions labelled Tx$_0$ and Tx$_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of Tx$_j$ does not exceed the total amount pointed to by its inputs, and that the pointed-to output of Tx$_i$ has not already been spent by another valid transaction. The protocol engine 451 evaluates the result from the script engine 452 together with the one or more protocol-level conditions, and only if they are all true does it validate the transaction Tx$_j$. The protocol engine 451 outputs an indication of whether the transaction is valid to the application-level decision engine 454. Only on condition that Tx$_j$ is indeed validated, the decision engine 454 may select to control both of the consensus module 455C and the propagation module 455P to perform their respective blockchain-related function in respect of Tx$_j$. This comprises the consensus module 455C adding Tx$_j$ to the node's respective ordered set of transactions 154 for incorporating in a block 151, and the propagation module 455P forwarding Tx$_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Delegated Authorisation

FIG. 5 relates to a system 500 according to a first aspect of the present disclosure for the provision and use of delegated authorisation tokens, preferably as a part of a platform processor 504 that provides a plurality of services that are associated with a blockchain 101. The platform processor 504 is optionally the platform as described in greater detail below with respect to FIGS. 11 and 13. It will be appreciated by a person skilled in the art however that the delegated authorisation methods and systems as described herein may be used in other services including services not associated with a blockchain 101. The platform processor 504 is configured to communicate and/or otherwise interact the blockchain 101, a client 502, and/or a delegated user 506. The platform processor 504 is described herein as a monolithic server for ease of illustrative purposes. Where "client", "user", or similar terms are used, it will be understood that this often refers to a device owned by said client or user. A person skilled in the art will appreciate that it may be implemented as a single server, a mainframe, a collection of servers, a microservice, a collection of microservices, cloud service, any combination of the preceding and/or other computing platform or platforms. The term "service" or "services" as used herein is to be understood as a general term for a collection of computing functions or behaviours and not strictly specific to one single application running on one server. A non-exhaustive list of examples and options are presented here. The service may be one application or multiple applications. The service may be running on one hardware server/device, or on multiple. For example, below is there is provided a database separate to the service, this may equally be instead comprised as part of the same service.

The system 500 comprises a client 502 which is a user that has authorisation to a service on the platform 504. The client's authorisation allows for the client 502 to provide delegated authorisation to other users 506 (herein after called delegated users or delegates). The client 502 may be considered the "owner" of the service and preferably triggered the creation of the service on the platform 504. The client 502 wishes to delegate authorisation so that other users have access to the service. Preferably, the delegated authorisation gives permission for delegated users 506 to interact 512 with the platform 504 which is running the service. More preferably the interactions are to read, write, or both read and write to/from the service. Even more preferably, the service described is an event stream which is described in greater detail below with reference to FIGS. 10A-C, 11, and 12. A skilled person will understand that the methods and systems associated with delegated authorisation of the service here may be used with other services too.

Optionally, there are other interactions that delegated users can have with the service. The types of interactions allowed will depend on the service. For example, if the service is providing financial transactions, a delegated user may have delegated authorisation to create or sign transactions. Preferably, the delegated authorisation does not give permission for more delegated users to be added or delegated authorisation tokens to be created.

As described below in greater detail with reference to FIGS. 6 and 7, according to an embodiment of the present aspect, the client 502 generates delegated authorisation tokens and provides 508 them to the delegated users 506.

As described below in greater detail with reference to FIGS. 8, and 9A-C. according to an embodiment of the present aspect, the delegated users 506 are configured to generate requests which comprise these tokens, the requests are sent 512 to the service running on the platform 504. Upon reception of the request, the service will validate the request and, depending on the validity of the delegated authorisation token, process the request.

Delegated Authorisation Token Generation

FIG. 6 shows a method 600 according to an embodiment of the first aspect. The method 600 describes the generation of delegated authorisation tokens (which are also described as delegatedAuth tokens herein) and is used when a client 502 wishes to authorise more than one delegated user to interact with the delegated service. Preferably, this method is conducted completely by the client with no interaction with any other entities in the system 500. Optionally, the delegated authorisation tokens have an associated index which may be provided alongside the delegated authorisation token.

The delegated authorisation tokens are generated such that they form a set of related tokens. Preferably the set is a "chain" of tokens because each delegated authorisation token (except for the first) is based on the preceding one in the chain, as described below.

Firstly, two random numbers are generated 602: an initial value (referenced as IV below) and a seed value (referenced as seed below).

Optionally, a number of delegated authorisation tokens needed is determined 604. This number is usually equal to (or sometimes greater than) the number of users the client wishes to provide delegated authorisation to.

Then the first delegated authorisation token is generated 606 based on these two values. Preferably, the first delegated authorisation token is based on the concatenation of the initial value and the seed value. More preferably, first delegated authorisation token is based on a one-way function that uses the initial value and the seed value as inputs. Even more preferably, the first delegated authorisation token is based on the hash of the concatenation of the initial value and the seed value.

Optionally, the seed value is securely deleted such that no entity can use it again.

Further delegated authorisation tokens are generated 608. Each delegated authorisation token generated is based on at least the previously generated delegated authorisation token. Preferably, each further delegated authorisation token is generated based on the initial value and the previously generated delegated authorisation token. The previously generated authorisation token preferably refers to the delegated authorisation token generated immediately before the one currently being generated and may also be described as a preceding delegated authorisation token. More preferably, each further delegated authorisation token is generated based on a combination of the initial value and the previously generated delegated authorisation token. Even more preferably, each further delegated authorisation token is generated based on a one-way function taking the combination of the initial value and the previously generated delegated authorisation token as an input. Yet still more preferably, each further delegated authorisation token is generated based on a hash of the combination of the initial value and the previously generated delegated authorisation token. Even still more preferably, the combination is concatenation of the initial value on the previously generated authorisation token.

The combination of the initial value and the previously generated delegated authorisation token can be described as a pre-image.

Alternative to pre-pending the initial value to the previous delegated authorisation token (the concatenation above) is to not use the initial value at all and thus the previous delegated authorisation token is based on only the previous delegated authorisation token generated. To generate the next delegated authorisation token this way, a one-way function is used on the previous delegated authorisation token and the output of said function is the next delegated authorisation token. Preferably the one-way function is a hashing function.

The delegated authorisation tokens are preferably are in the form of a binary string and/or byte string. The length of the binary string depends on the one-way function used. If the one-way function used is SHA256, then the delegated authorisation tokens will be 256-bits long (or 32 bytes). Optionally, this binary string can be represented and/or encoded as a hexadecimal string, a base64 string, or any other appropriate encoding scheme.

This generation step 608 is stopped when the client 502 generating the tokens decides they have enough tokens and/or when number of tokens generated is equal to or greater than the number determined in step 604.

Preferably, the above described method 600 is used to generate for each type of interaction between the delegated users and the service. Preferably, one chain of delegated authorisation tokens is generated for read access to the service, and another chain of delegated authorisation tokens is generated for write access to the service. Each user which the client wants to provide read authorisation receives one of the read delegated authorisation tokens and each user which the client wants to provide write authorisation receives one of the write delegated authorisation tokens. The number of read and write delegated authorisation tokens need not be the same.

Optionally, a delegated user may receive more than one token. This would, for an interaction limited example such as writing as discussed here, allow the delegated user more writes.

The steps relating to generating 606, 608 the chain of delegate tokens can also be shown in the table below. In this table, 'R' is used to represent tokens and data related to "read" authorisation and 'W' is used to represent tokens and data related to "write" authorisation. The 'H' function is a one-way function, preferably a hash function and the '∥' symbol preferably represents a concatenation of each side of said symbol. 4 tokens of each are created by way of example only. Different numbers for each type of token could be used.

| | |
|---|---|
| $R_{H3} = H(R_{IV} \parallel R_{seed})$ | $W_{H3} = H(W_{IV} \parallel W_{seed})$ |
| $R_{H2} = H(R_{IV} \parallel R_{H3})$ | $W_{H2} = H(W_{IV} \parallel W_{H3})$ |
| $R_{H1} = H(R_{IV} \parallel R_{H2})$ | $W_{H1} = H(W_{IV} \parallel W_{H2})$ |
| $R_{H0} = H(R_{IV} \parallel R_{H1})$ | $W_{H0} = H(W_{IV} \parallel W_{H1})$ |

As can be seen from the table above, the final delegated authorisation token in the chain of delegated authorisation tokens is the H0 hash.

Preferably, for the write delegated authorisation tokens, there is also a maximum writes per token. This optionally extends to other interactions where the client may wish to limit the number of interactions each token is able to do.

An example of the method 600 described above is described with reference to FIG. 10D. An example system 1070 is shown where the client, taking a random initial value IV and seed, creates a chain of delegated authorisation tokens. Next a "create" event stream message is sent to an Event Stream service, the create event stream message comprising the final delegated authorisation token (H0) and the initial value. The Event Stream service creates the event stream, associates the final token and the initial value with the created stream and replies to the create message with an "esid"—an "event stream identifier". The esid is used for any future interactions by the client and/or any delegated users.

The create request is preferably a JSON object and comprises the following:

```
"readAccessControl" : {
    "delegatedReadH0" : < RH0 >,
    "delegatedReadIV" : < RIV >
},
"writeAccessControl" : {
    "maxWritesPerDelegate" : < integer >,
    "delegatedWriteH0" : < WH0 >,
    "delegatedWriteIV" : < WIV >
}
```

According to a further embodiment, a method 700 of distributing the required information for providing the users with delegated authorisation is shown in FIG. 7.

With the delegated authorisation tokens generated 702, optionally by the embodiment as set out in FIG. 6, the client provides 704 tokens to each delegated user and provides 706 any data required for the platform or service to determine the validity of any delegated tokens. Preferably, the data required for the platform or service to determine the validity of the tokens comprises the last delegated authorisation token in the chain of delegated authorisation tokens (WH0 and/or RH0, as can be seen in the above examples) and the initial values (WIV and/or RIV, as can be seen in the above examples).

The delegated authorisation tokens inherently have an ordinality to them and thus can be indexed. Preferably, when providing 704 each delegated user with their token, the index of the token is also provided.

While the steps 704, 706 relating to providing data to the delegated users and platform are presented as sequential, they may be conducted in any order or at the same time.

As each chain of tokens is generated per-interaction (read or write for example), the method 700 is conducted for each type of interaction the client wishes to delegate.

Delegates may be provided their delegated authorisation tokens in advance of the service being set up or may be provided on demand once the service is running.

The client 502 may, at any time, revoke any number or all of these tokens. This is conducted by the client creating a request comprising data indicative of the service they wish to revoke tokens from (in the example provided below, this means identifying the specific event stream), the type of interaction the tokens are to be revoked from (read or write for example), the tokens to be revoked and/or the index of the tokens to be revoked. Preferably both the tokens and index to be revoked are used, optionally only one is used. Preferably, all of the tokens start as enabled/un-revoked and the client 502 must revoke them. Specific examples of revocation are provided in FIGS. 10C and 10E.

Being able to revoke individual tokens allows greater flexibility and control to the client 502 in their management of access to the service. Further, as a result of a delegated user 506 not knowing other tokens and being unable to calculate them, when a client wishes to revoke access, there is no need to notify or update any other delegated users still enabled/un-revoked thereby saving computing resources and time.

Delegated Authorisation Token Use

Referring to FIG. 8, a method 800 according to a further embodiment is shown describing a process of receiving 804, validating 806, and processing 808 a request to interact with the service. In the present embodiment and for ease of description, this method 800 is described as being conducted by the service running on the platform. In alternative embodiments, the platform is running a further process that is configured to conduct the method 800 here. This process can be described as an "authentication service" or "access control service" and is optionally running on the same platform 504 as the service being interacted with. As a further alternative, the authentication service behaves as a filter before the service receives the request.

Prior to the step of receiving a request from a delegated user, the service receives 802 the appropriate validation data from the client that generated the delegated authorisation tokens. The validation data at least comprises the final hash (or final delegated authorisation token) in the chain of delegated authorisation tokens. This final token is also described as the client received final delegated authorisation token, as it has come from the client. This final hash can be represented as H0, $R_{H0}$, or $W_{H0}$, as is used herein. Preferably the validation data also comprises the initial value as used in the process of generating the chain of delegated authorisation tokens as described above with reference to FIG. 6.

The service can receive 802 this data at any point before validating requests from delegated users. Preferably the validation information is provided to the service when a new event stream is being created.

At some time later, the service will receive 804 requests from delegated users to use the service and/or event stream. These requests comprise a delegated authorisation token. If the request does not comprise a delegated authorisation token, or does not come from the client, then they are not considered valid. Requests from the client preferably do not require delegated authorisation tokens and will be validated or authenticated using a different system.

The service determines 806 the validity of the request based on the delegated authorisation token and validation data. This step is described in greater detail with respect to FIGS. 9A-D. The validation occasionally comprises recreating a subset of the chain of delegated authorisation tokens, starting from the received delegated authorisation token up to the final delegated authorisation token. If the recreated final delegated authorisation token is the same as the client received final delegated authorisation token, then the received delegated authorisation token is valid.

Optionally, the service further determines the validity of the request based on whether the delegated authorisation token has been revoked or not. If the token and/or index has been revoked for this service and interaction, then the request will be found to be invalid.

Finally, depending on the validity determined in step 806, the request is processed. If the token is not valid, then the request is not processed.

Where this method 800 is run by an authentication service, the processing step 806 comprises the authentication service providing an indication to the service and/or platform as to the result of the validation. Alternatively, where the authentication service is acting as a filter, the processing step 806 comprises dropping the request and it does not forward the request to the service if the token is invalid. If it is valid, it will pass the request on the service, optionally with additional information to indicate that the request is valid.

The methods shown in FIGS. 9A-D describe different example situations of how the service may validate received delegated authorisation tokens. The first method 900 shows when a first request is received. The chain of delegated authorisation tokens is re-created starting from the received delegated authorisation token. The second method shows when a further request is received but with an index such that it is higher in the chain than any previously received delegated authorisation tokens and the service wouldn't have calculated it. The third method shows when another further request is received, and the index is such that it is later in the chain and the service has already calculated it.

Where "higher" and "lower" are used in reference to the chain, this refers to the index supplied. "Higher" relates to having a higher index number and being further away from the final delegated authorisation token and "lower" is the opposite. An index of zero is the lowest index and indexes the final/last generated delegated authorisation token in the chain. The delegated authorisation token with index 0 is the token that is provided by the client for verification purposes as discussed above.

Preferably, the validation method uses the same method the client does to construct the chain of delegated authorisation tokens. The first, second, and third example situation methods 900, 920, 940 show the hash chain (or a subset thereof) is reconstructed using substantially the same method as it has been created with.

FIG. 9A shows a first validation method 900 where the first time a token is received 902 by the service. The first request comprises a first received delegated authorisation token. Preferably the request also comprises an index.

As this is the first received delegated authorisation token, the service will not have generated any other parts of the chain of delegated authorisation tokens.

Next, starting from the first received delegated authorisation token, the chain of delegated authorisation tokens is regenerated. The chain is generated using the same method it was created with as described above. Thus, the chain is preferably created by concatenating the initial value with the first received delegated authorisation token, then hashing that to receive the next delegated authorisation token in the chain. This step is repeated a number of times. If the index is present in the request, then the number of delegated authorisation tokens in the generated chain is based on the index. The index can be seen as the distance from the final delegated authorisation token in the chain of delegated authorisation tokens. Further delegated authorisation tokens are generated until the final delegated authorisation token is generated H0'. For example, if the index in the request is 3, then three more hashes will be generated (H2', H1', H0') as shown below. The ' symbol is used to signify that this a chain based on the received delegated authorisation token and may not be the same as the client generated chain. The 'R' and 'W' have not been used here because the process is the same for the read ('R'), write ('W'), or any other interaction.

$$H3' = \text{Received token}, H2' = H(IV\|H3),$$

$$H1' = H(IV\|H2), H0' = H(IV\|H1)$$

Obtaining H0' can also be conducted by a single equation:

$$H0' = H(IV \| H(IV\|H(IV\|\text{Received token})))$$

Preferably, the received delegated authorisation token (H3') and each of the intermediate hashes H2' and H1' (which are also delegated authorisation tokens and may be used by future delegates) in the chain are stored for future use if the token is found to be valid. The usage of these intermediate tokens is described further in relation to the example method 940 below shown in FIG. 9C. Even more preferably, the received and generated delegated authorisation tokens are stored in a data storage mechanism (such an array, database, hard drive, or any other similar system or module) such that they can be indexed according to their position in the chain. Advantageously, associating the delegated authorisation tokens with their index (also called indexing) allows for easier lookup as in the situation described with reference to FIG. 9C. If the token is found to be invalid, the constructed whole chain is not stored and/or deleted.

The validity of the first received token is determined based on a comparison of the generated final hash H0' with the final hash received from the client as a part of the validation data in the initial step 802 of the above described validation method 800. If H0 and H0' are equal, then the delegated authorisation token is valid.

Alternatively, if no index is used, the method is modified such that the delegated authorisation tokens are continually generated and each generated token is compared with H0. The process stops when a successful comparison is made or when the maximum number of tokens is reached. If the maximum number is reached and no successful comparisons are made, then the first received delegated authorisation token is found to be invalid.

Referring to FIG. 9B, a method 920 is shown where a further request is received 922 also comprising a delegated authorisation token and index. For the purposes of illustration, in this example method, the delegated authorisation token and/or index has not been seen by the service before and it is not present in any pre-calculated chain of delegated authorisation tokens.

Upon reception, the service determines 924 whether the delegated authorisation token is already present chain previous generated. Preferably, using the indexed data storage mechanism, a lookup is conducted based on the index. If the data storage mechanism is an array, this means accessing the data at the index's entry. In the present example, there is no delegated authorisation token at the index.

Alternative to using the index to index the delegated authorisation tokens, the method may simply loop over all of the stored delegated authorisation tokens and check whether it is present or not.

As the token is not already present in the currently stored chain, more of the delegated authorisation token chain must be generated to confirm that it is present in the chain as generated by the client. The chain is constructed similarly/the same as described previously (which is to preferably concatenate the initial value with the further received delegated authorisation token and pass that through a one-way function repeatedly). Preferably, instead of repeating these steps all the way to the final delegated authorisation token in the chain (H0), these steps are repeated until first previously generated or received delegated authorisation token in the chain of delegated authorisation tokens is encountered. Because the method of generating the tokens is deterministic, given the same starting data, the same chain will be generated. This is true starting from any point in the chain— not just the first delegated authorisation token.

Because a one-way function is used, in the construction of the chain, the service (or any other devices in the system including other delegates) cannot calculate delegated authorisation tokens higher up in the chain from any given point, even if they have the initial value being pre-pended to their token. This is a property of a one-way function that with the output, calculating the input is impossible. Thus, the chain must always be constructed forwards from any received delegated authorisation tokens.

For example, if the received token has an index of 5, and we have the delegated authorisation tokens of index 3, 2, 1, 0 (H3, H2, H1, H0) already stored in the data storage mechanism, to determine whether the further received delegated authorisation token is valid or not, only the following calculations need to be performed:

$$H5' = \text{Received token}, H4' = H(IV\|H5'), H3' = H(IV \| H4')$$

If H3' equals the already stored H3 then the remainder of the chain will be the same, the further received delegated authorisation token will be valid, and the remaining concatenation and one-way function steps can be skipped. If H3' doesn't equal H3 then the remaining chain will be different also (and thus the calculations can be skipped also) and the delegated authorisation token is not valid.

Thus, the validity of a received delegated authorisation token, in this example, is determined based on a comparison of one of the delegated authorisation tokens in the currently generated delegated authorisation tokens (preferably the last of the currently generated delegated authorisation tokens) with a stored and/or previously generated delegated authorisation token. Preferably the token with the highest index of the stored and/or previously generated delegated authorisation tokens.

It is likely that the stored delegated authorisation token with the highest index is a previously received delegated authorisation token that was found to be valid. Thus, this method could also be described as: determining the highest index of any previously received delegated authorisation tokens, generating further delegated authorisation tokens based on the received delegated authorisation token until a delegated authorisation token with an index equal to the index of a previously received and valid delegated authorisation token, determining the validity of the received delegated authorisation token based on a comparison of the final generated delegated authorisation token with the previously received delegated authorisation token. If the received token is valid, this token will then be the token with the highest index of any previously received tokens.

Figure 9C:
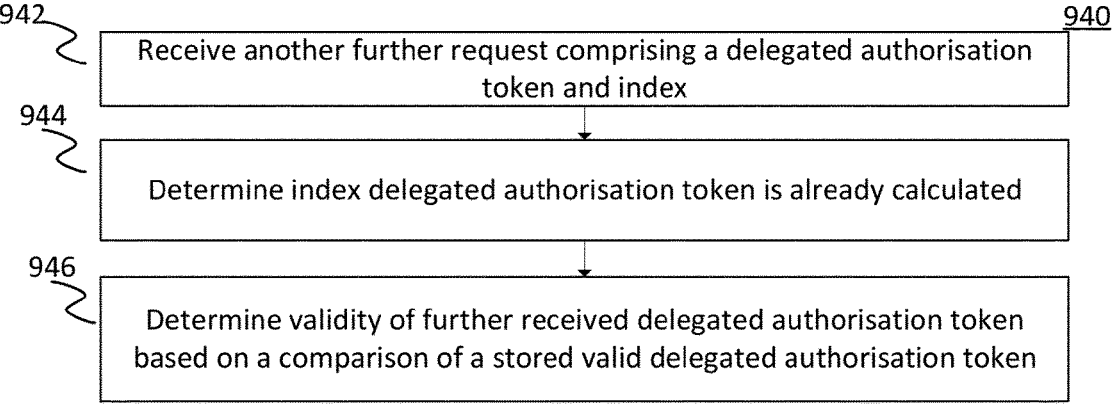

Referring to FIG. 9C, an example method is shown where another further request is received 942 comprising another further delegated authorisation token and index. In this example, the token is already part of the stored chain of delegated authorisation tokens. It may be already stored because this token has been used before, or because a valid token with a higher index has been received prior to receiving this one.

With the another further delegated authorisation token and its index received 942, it is determined 944 (for this example) that there is a delegated authorisation token pregenerated and stored associated with that index. Preferably the determination comprises querying the data storage mechanism for a delegated authorisation token at the given index.

A comparison is made between the another further received delegated authorisation token and the delegated authorisation token stored associated with the index. The validity of the token is based on this comparison. Preferably, if the tokens are the same then the received one is valid. If the tokens are not the same, then the received one is invalid.

Preferably the first, second, and third methods 900, 920, 940 are used together to validate delegated authorisation tokens. Advantageously, these methods 900, 920, 940 provide caching such that chains of delegated authorisation tokens do not need to be calculated every time a delegated authorisation token is received thus saving computer processing power and time while still providing strong access control security. If there are a large number of delegates, the hashing process may take a while to compute.

Alternatively, only the first method 900 is used. If only the first method 900 is used, then the whole chain of delegated authorisation tokens is generated upon reception of every request and none of the chain is stored. This provides the advantage of not requiring storage of intermediate delegated authorisation tokens which might not even be used and still maintains strong access control security.

Figure 9D:
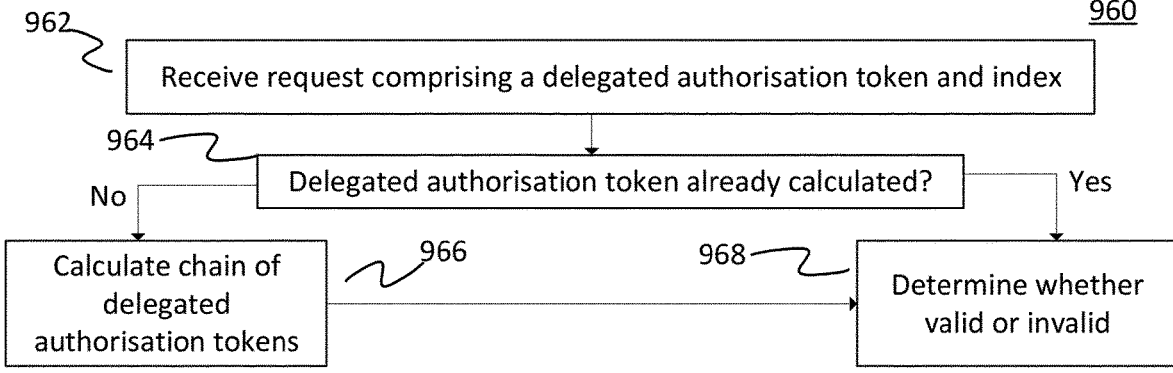

Referring to FIG. 9D, an overall method 960 is shown to illustrate how and when these occur. When any request is received 962 comprising a delegated authorisation token and index, a determination 964 is made as to whether it has been calculated before and stored in the data storage.

If the delegated authorisation token has not been generated before, then, starting from the index, further delegated authorisation tokens are generated 966 until either the final delegated authorisation token is generated, or a previously calculated/received known valid delegated authorisation token is generated. The received token is considered valid if any of the generated delegated authorisation tokens are equal in both value and index to any previously received or generated delegated authorisation tokens. Preferably, only enough delegated authorisation tokens are generated such that the index of the previously received or generated delegated authorisation token is met. For example, if H3 is previously received or generated, and H5' is currently received, only H5', H4', and H3' are generated. The validity of the currently received token is determined by comparing the currently delegated authorisation token with the lowest index with the previously received/generated delegated authorisation token with the highest index. For example, by comparing H3 with H3' as described above with respect to FIG. 9B.

When validating write delegated authorisation tokens, preferably the client also provides a "max writes" value as a part of the validation data in the first step 802 of the above described validation method 800. Preferably, another validation step is used to ensure no delegated user writes more data to the service than they are allowed. The service stores a "number of writes" value associated with each delegated authorisation token. This starts at zero and increments every time the delegated user writes to the service. After validating the token, a "max writes" validation is also conducted. This validation compares the "number of writes" with the "max writes". If the "number of writes" for the delegated authorisation token is equal to or greater than the "max writes" value, then the request is not processed. If it is under then the "number of writes" value is incremented, and the request is processed. Optionally, the "number of writes" is only incremented if the request successfully writes data to the event stream and/or blockchain. A person skilled in the art will appreciate that this can apply to other interactions beyond writing. Writing has been used merely as an example.

In some embodiments, the request is in the form of an HTTP (Hypertext Transfer Protocol) request or an HTTPS (Hypertext Transfer Protocol Secure) request. Optionally the delegated authorisation token is stored in the header of the HTTP(S) request. Optionally, the header is in the form of:

Authorization: Delegated base64 (<delegatedAuthIndex>":" <delegatedAuth>)

Base64 encoding of the two values delegatedAuthIndex and delegatedAuth is optional. Alternatively, a binary representation of the two is used.

Advantageously, by moving of the delegated authorisation to the header, the authorisation process can be more compatible with Basic HTTP Authentication framework as described in RFC 7235.

A Single Delegate

Where only one delegate is wanted for reading and/or writing, then only one hash is generated using the method 600 as described with reference to FIG. 6 which is based on the combination of an initial value and a seed value being used as an input to a one-way function. The service receives this "final" (and only) delegated authorisation token for validation purposes. The initial values will never be used because there is no chain of delegated authorisation tokens to re-construct, and as such the client can pass any random data they wish, or nothing, to the service. The service will only ever receive the final delegated authorisation token and therefore validation of any received requests is a comparison of the received request's delegated authorisation token and the final delegated authorisation token. Any other token will be invalid.

Platform System

According to an aspect, any one or more of the preceding aspects related to client delegation may be used with a platform processor as described here. Preferably, the client delegation aspects are for use in delegating access to data services 1502, compute services 1504, and/or commerce services 1506 access through which is provided by the API 1508. The delegated access may come in the form of read, write, read/write, submission, and/or any other action that may be associated with the particular service. The present aspect may be Platform as a Service (PaaS) and Software as a Service (SaaS) offering that advantageously enables rapid delivery of useful real-world business and technical applications, such as management of software controlled technical systems or smart contracts, using a blockchain network such as the BSV blockchain.

Referring to FIGS. 10A-10E, example interactions with the platform service (as described in greater detail below with reference to FIGS. 11 to 13) as shown. The example interactions shown are: appending events to an event stream, querying (or reading) events on an event stream, revoking a delegated user from interacting with an event stream, creating an event stream and delegated authorisation tokens, and an overall method comprising the different embodiments and aspects of the system. These are provided by way of example of how the delegated authorisation tokens are used in the context of event streams and platform services.

In these example embodiments, the platform (as described in the previous example embodiments) comprises of a number of components, including the event stream service 1004, a client authentication service 1006, a database 1008, and a message bus 1010.

In these examples, the platform service provides a number of different EventStreams and as such the client and/or delegated user provides an identifier as to which specific EventStream they are wishing to interact with. Thus the request further comprises a service identifier. Optionally, if the platform were only providing one such service to interact with, no identifier would be required.

Figure 10A:
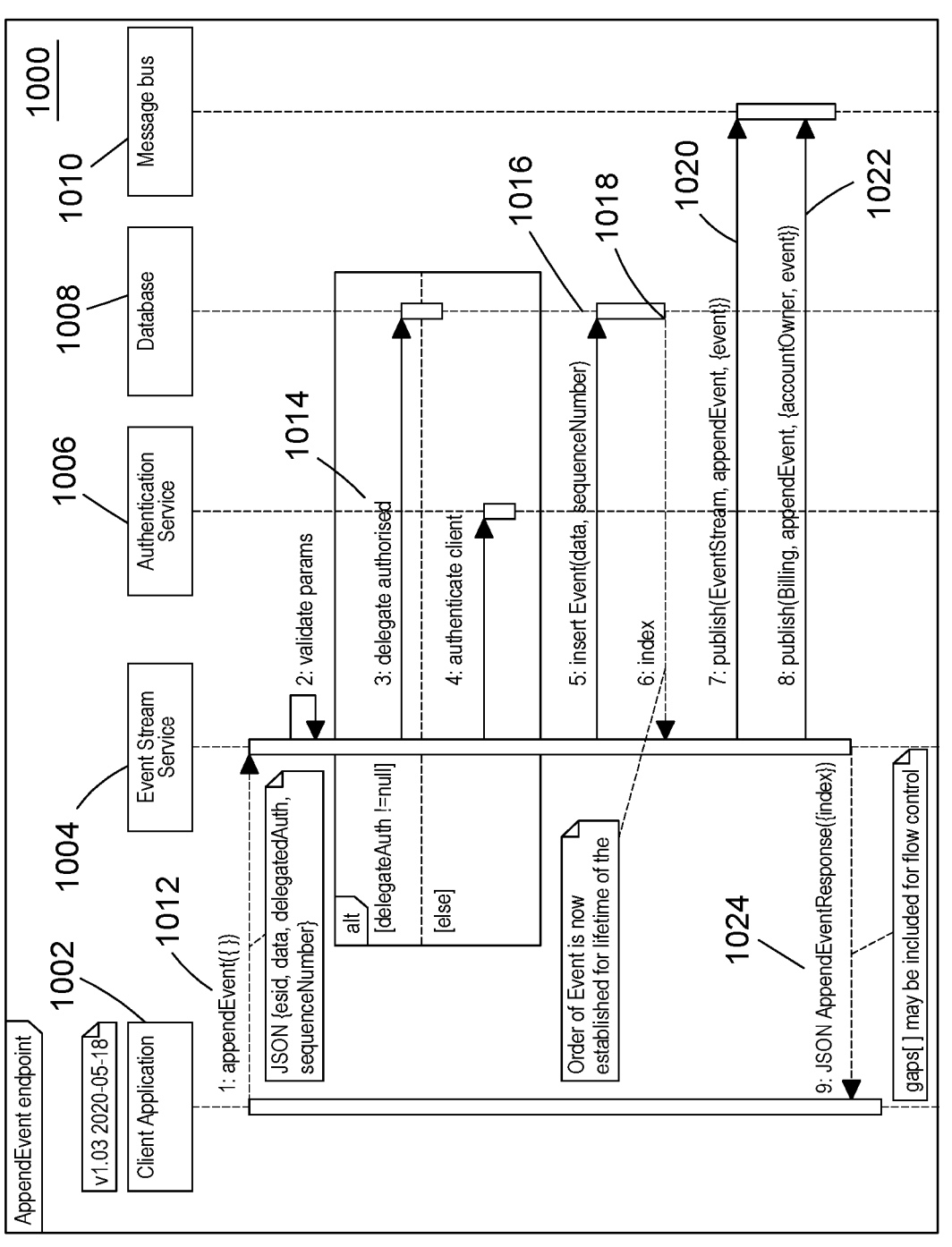
FIGS. 10A-E illustrate examples of interacting with an Event Stream Service.

Starting with FIG. 10A, a client application 1002, which may be the client 504 or delegated user 506 as described above, is appending an event to the Event Stream Service 1004. The client application 1002 sends an "appendEvent" request to the Event Stream Service. The "appendEvent" request comprises the data associated with the event and, if the client application is a delegated user, the delegatedAuth information which comprises the delegated authorisation token and the index. If the client application is the client 502, then a different client authentication process is conducted using the client authentication service 1006 (separate from any authentication service described above or in particular as described with reference to FIG. 8).

The event stream service 1004 validates the data then, if there is delegated authorisation information associated with the request, that information is passed 1014 to the database 1008. The database is configured to conduct the validation methods as described with reference to FIGS. 8-9D and to store any previously generated delegated authorisation tokens. The database responds to the received delegated authorisation information with the validity of the delegated authorisation (not shown). As this is a writing service, the database will also validate that the number of writes associated with the specific delegated authorisation token used has not exceeded a previously defined "max writes".

With an indicator of a valid authorisation, the event stream service 1004 continues to process the append information. This includes inserting 1016 the event into the database 1008, receiving 1018 an index of the event, then proceeding to publish 1020 the event to the blockchain via a message bus 1010, finalise 1022 any billing actions, and finally 1024 responding to the client application 1002 with an indication that the event was successfully appended.

Figure 10B:
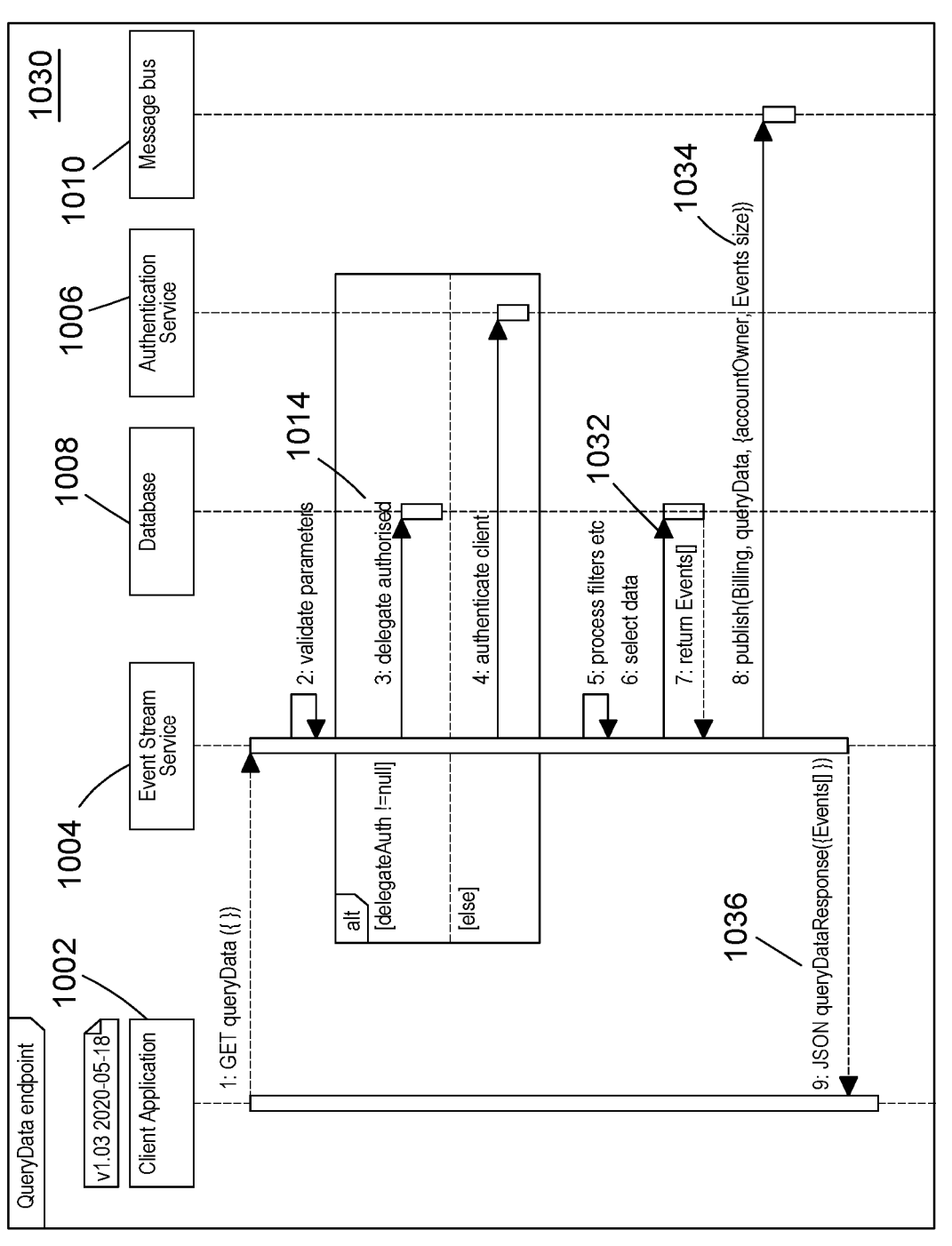

Moving to FIG. 10B, the client application 1002 is requesting to read data from the Event Stream Service 1004. The client application 1002 sends an "queryData" request to the Event Stream Service 1004. The Event Stream Service 1004 validates parameters and goes on to authorise 1014 (where a delegated authorisation token is present) or authenticate (if an alternative client authentication service is used) in the same or similar method as with the "appendEvent" example 1000. As this is a reading service, there preferably are no max reads, writes, or other maximum interactions to record.

With the client application 1002 authenticated or authorised, any filters that are part of the data query (such as time ranges, types of data, the user that supplied the data, and others) are used to construct a database query. The database query may be in an SQL format. With the query formatted, it is submitted to the database 1008 in the form of a select. Any billing information is submitted 1034 to the message bus 1010 for other services to review and manage. Finally the requested data is returned 1036 to the client application in the form of a JSON response.

Figure 10C:
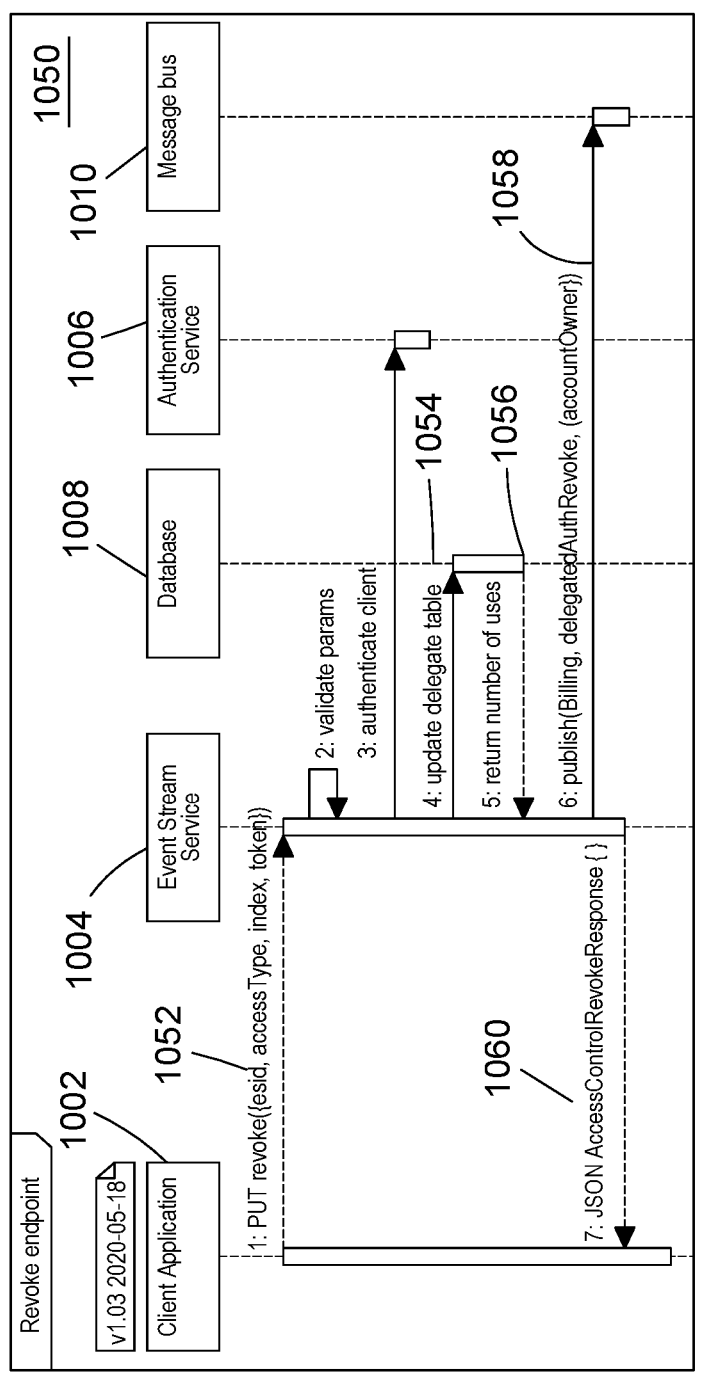
Figure 10D:
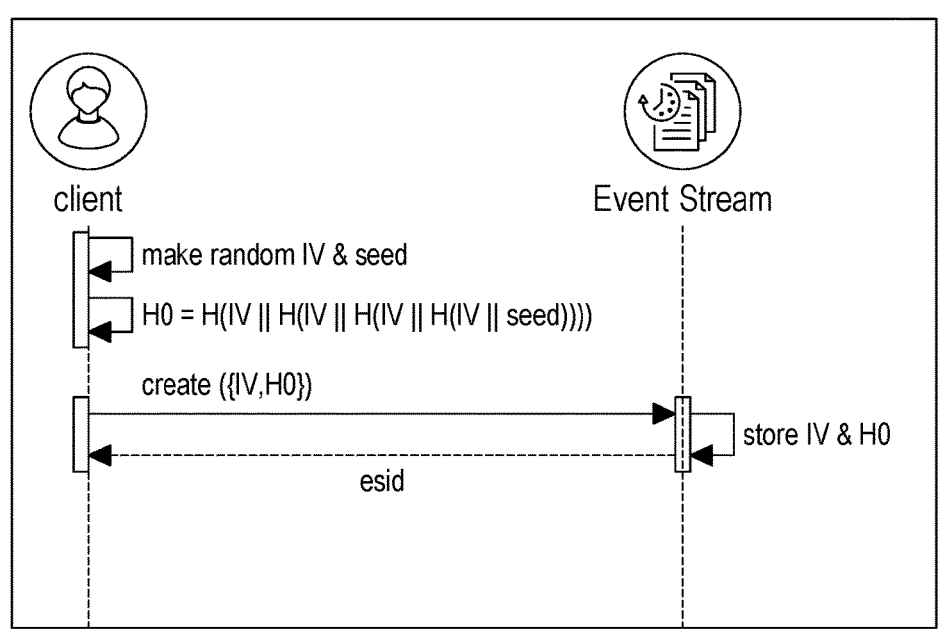

In FIG. 10C, the client application 1002 is wishing to revoke a delegated authorisation token. Preferably, only the client 502 is capable of undertaking such actions and as such, there is no option for a delegated authorisation token to be authorised-only the client authentication method is available.

The client submits 1052, to the Event Stream Service 1004, an HTTP request comprising the PUT method to revoke. The request comprises:

the esid, which is the ID of the EventStream, the accessType, which is the interaction the client wishes to modify so that the database knows which chain associated with the EventStream to refer to—preferably "read" or "write"

index, which is the index of the delegated authorisation token in the chain, and token which is the delegated authorisation token.

These parameters are validated and the client is authenticated.

The Event Stream Service 1004 submits 1054 a further request to the database 1008 to update the data storage mechanism that is storing the delegated user information. Preferably, there is a column, flag, or other piece of data associated with each delegated authorisation token and/or each index (as not all delegated authorisation tokens may be known). This piece of data will be updated to reflect that, even if the correct index and delegated authorisation token are provided, the token will not be considered valid. Alternatively, if there is a "max writes" associated the service, the number of writes for that delegated authorisation token is set equal to "max writes", which will ensure all future interactions will not be valid.

The database 1008 will return 1056 the number of times the delegated authorisation token has been used to the Event Stream Service 1004. Any billing information is submitted 1058 to the message bus 1010 for other services to review and manage. Finally a response comprising whether the revocation was successful is returned 1060 to the client application preferably in the form of a JSON response. Optionally, the response also comprises the number of times the interaction was done using the revoked delegated authorisation token.

As described above, FIG. 10D shows a system 1070 with a client creating a chain of delegated authorisation tokens according to the second aspect and method according to FIG. 6 then creating an Event Stream on the Event Stream Service.

Figure 10E:
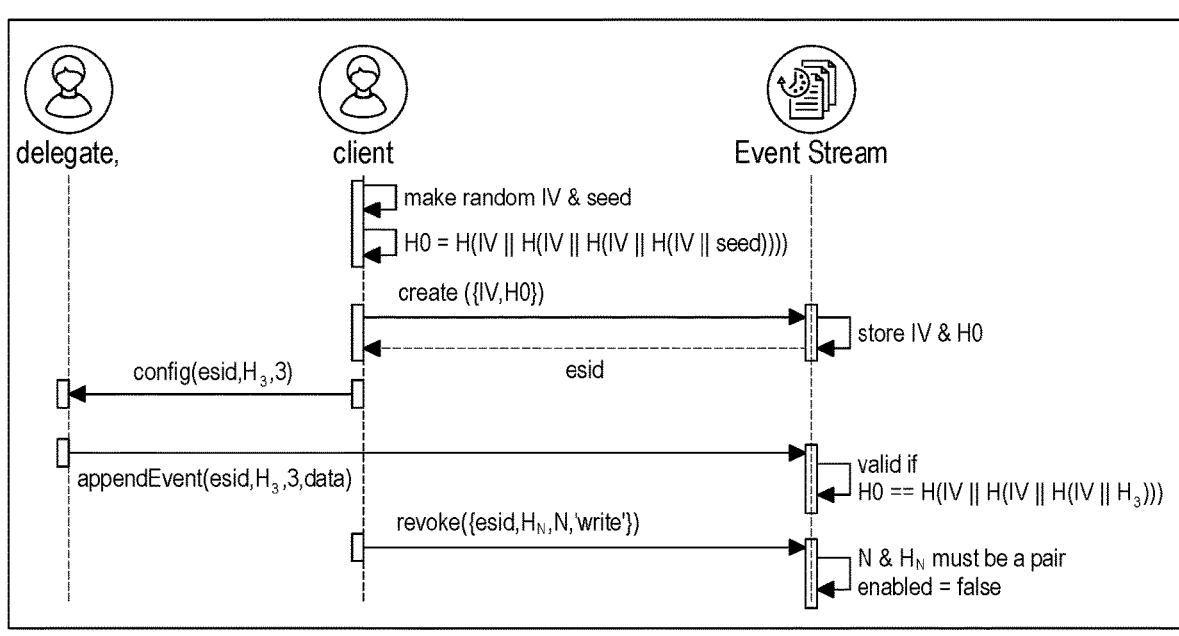

Referring to FIG. 10E, an overall system is shown comprising a number of embodiments and features as described herein. The client creates the chain of delegated authorisation tokens and creates an event stream as described with reference to FIG. 10D. At some time later, not necessarily directly after, the client provides the necessary details for a delegate to interact with the event stream. The details include an identified to identify which Event Stream on the Event Stream Service to interact with ("esid" in the figure), their delegated authorisation token ("H" in the figure), and the index ("3" in this example). With this information, the delegate has enough information to submit data to the Event Stream Service with an "appendEvent" request. The request comprising all of the same details received from the client plus any data the delegate wishes to submit to the Event Stream.

FIG. 10E also shows an example revocation occurring. Here, the client submits a request to revoke a delegated authorisation token. The request identifies the Event Stream to revoke the token from (esid), the token itself with the token's index, and the type of interaction to revoke ("write" in this example). If a valid token and index match for the given Event Stream, the Event Stream Service disables the token.

Figure 11:
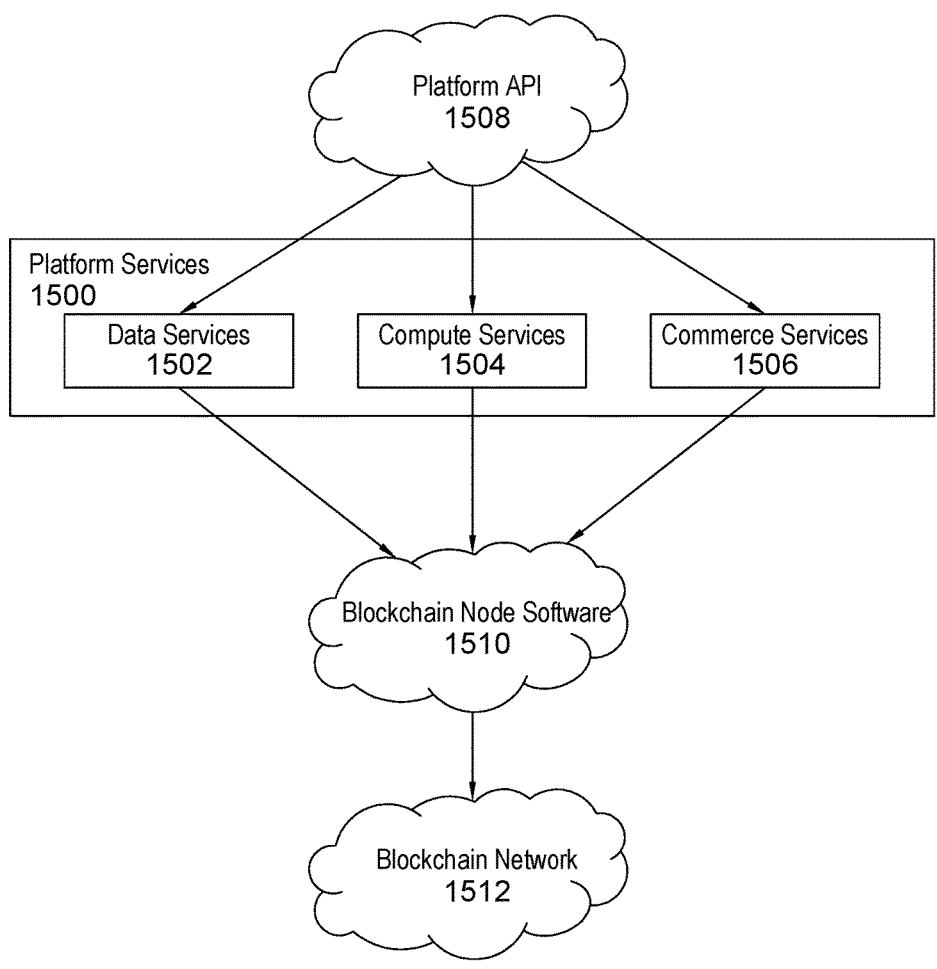
FIG. 11 is a schematic diagram, depicting an overview of a platform for a plurality of services associated with a blockchain, according to an aspect.

An overview of the platform services can be seen in FIG. 11 that shows a high-level schematic of the system. The platform service has a platform processor 1500 that provides an API 1508, via which the services may be accessed by one or more clients.

Platform Services 1500 as shown in this FIG. 11 are made up of three families of services and is aimed at allowing users and organisations to easily and securely make use of the advantages offered by the unique properties of a blockchain, without actually implementing any blockchain based software, knowledge, or libraries at the client end. These services are:

Data Services 1502 that aim to simplify the usage of the chain as a commodity data ledger. The Data Services preferably use the data structures and methods provided herein for implementing data writing to and reading from the blockchain.

Compute Services 1504 that aim to provide a generalised compute framework backed by a digital asset such as Bitcoin SV.

Commerce Services 1506 that provide enterprise-class capabilities for transacting using a digital asset such as Bitcoin SV.

Requests may be received via or using the HTTPS protocol from a client at the API, as the API is implemented as a web service. The requested services are then implemented by the one or more service modules or processing resources 1502-1506 using underlying software 1510, such underlying software 1510 being associated with the blockchain, i.e. to implement resources, libraries and/or key-management wallet implementations for creating, processing and submitting transactions associated with the blockchain. Once processed, transactions can be submitted to the blockchain network 1512 (instead of the client implementing any such functionality or transaction libraries). At most, the client may or can implement a digital wallet or the like associated with cryptocurrency or some other digital asset, but this is not essential as the platform service 1500 may also be able to provide and manage the digital asset for the client.

Figure 12:
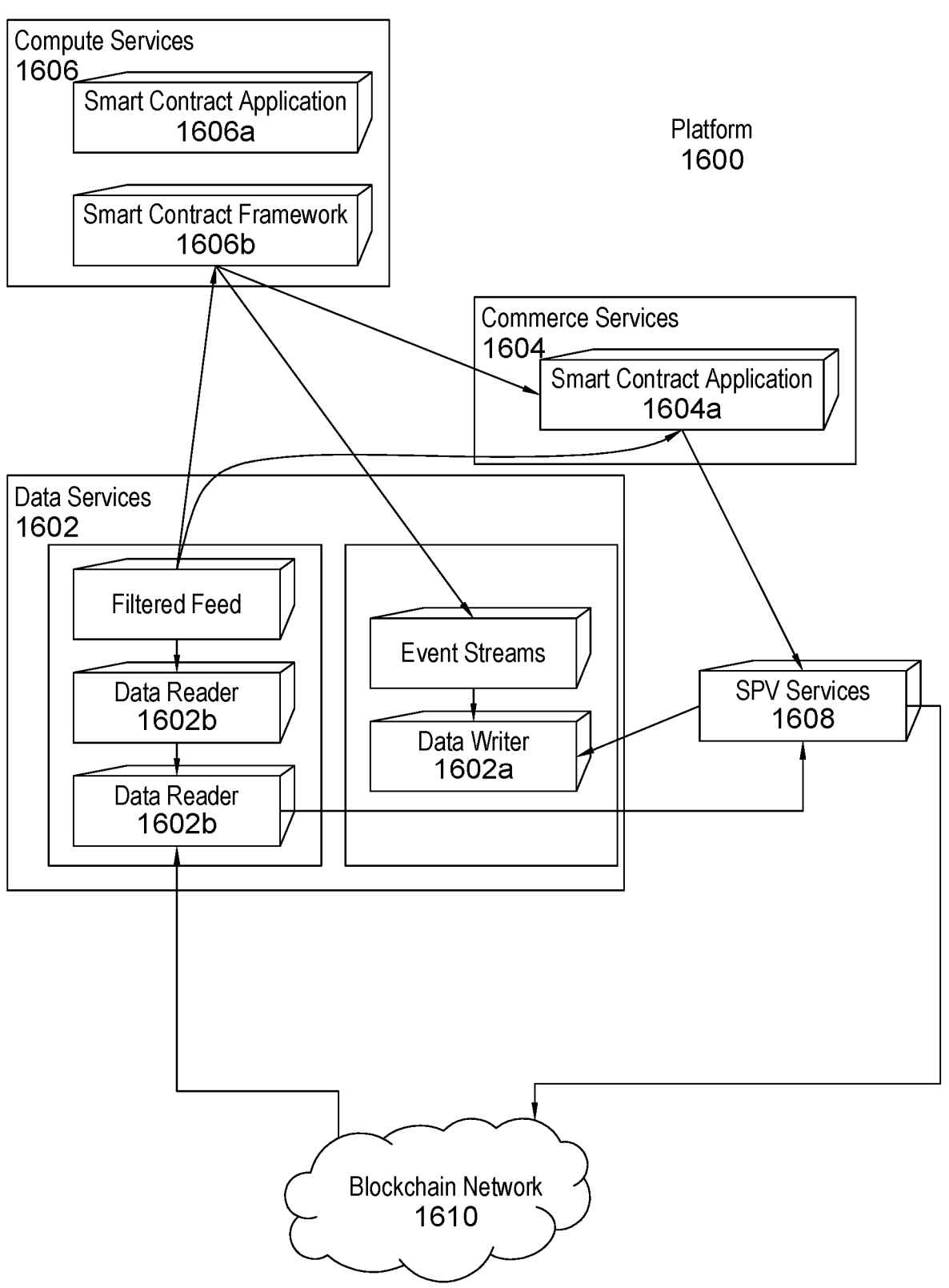
FIG. 12 is a schematic diagram, depicting the components of the platform of a plurality of services that are associated with a blockchain, according to an aspect.

FIG. 12 provides a more granular schematic view of the plurality of services associated with a blockchain, and which can be implemented by the platform 1600 that is associated with an API via which any one or more of the offered services can be accessed. As seen in this FIG. 12, the data services 1602 may include a data writer 1602*a* and a data reader service 1602*b*. Delegated authorisation as described above is preferably used to provide delegated access to the event streams, and/or data writer, and/or data reader. Similarly a delegated user wishing to access the data archive through use of the data reader 1602*b* preferably has delegated authorisation according to the description above. Further details of event streams are discussed with reference to FIGS. 4 to 8 of UK Patent Application No. 2002285.1 (filed in the name of nChain Holdings Limited on 19 Feb. 2020) and is hereby incorporated by reference. The data writer service 1602*a* enables clients to write data into the blockchain in a simple, secure and optimised manner. The data reader service 1602*b* enables the clients to send queries, which returns data that is stored in the blockchain. This may be using filtered streams in which the client may pre-define the type of data that they wish to read from the blockchain on an ad hoc or periodic basis, i.e. within a certain timeframe, or those associated with a set of related or unrelated events or documents that are processed in the blockchain 1610. The data archive feature allows access to logs of previous transaction for a specified event or contract.

The compute services 1606 of the platform 1600 includes an application 1606*a* and framework 1606*b* associated with smart contracts, which in some embodiments may be represented as a state machine in the blockchain 1610. The compute services 1606 interacts with the data services 1602 as data will need to be input and results provided to a client for any such computation.

Commerce services 1604 are responsible for provision of enterprise-class capabilities via enterprise wallets 1604*a* for transacting over the blockchain 1610, based on best-in-class security practices and technologies. For example, in some embodiments, enterprise wallets may implement functionality to enable blockchain transaction processing when more than one person, user, or account may need to sign off on a transaction meeting a defined criterion. i.e. associated with cryptocurrency of a large value above a certain predefined limit. An enterprise wallet may also include functionality to implement a threshold number and/or type of signatures to move large amounts of digital assets such as cryptocurrency or tokens representing another resource. The movement of these assets can then be represented on the blockchain following processing based on the criteria applied by such enterprise wallet implementation.

The SPV services 1608 (simplified payment verification) are applications that require information from the blockchain but do not include direct links to it, as they do not run a miner node. Such SPV service 1608 allows a lightweight client to verify that a transaction is included in a blockchain, without downloading the entire blockchain 1610.

Example Use Cases

The systems and methods described herein enable many different usage scenarios in relation to smart contracts, blockchain, and more specifically to Event Streams. The use cases provided here are as examples and a skilled person will appreciate that many more uses are possible. A skilled person will further appreciate that while specific reference is made to Event Streams, these cases may also be conducted using other smart contract technology, other blockchain technology, or similar.

Case 1—Voting Service

There are an ever-growing number of instances where the general public are offered the opportunity to vote on one subject or another (e.g. The Voice, Strictly, Goal of the Month, Favourite Artist etc). Such votes involve a potentially large number of independent people who wish to cast a vote (or votes), within a restricted time period. Such public votes typically use phone-in, web and phone App front ends. The embodiments described here can provide a low-cost scalable backend that offers transparency and public scrutiny using Event Streams and delegated authorisation.

Suppose a Vote master (which acts as the client 502 as discussed above) wishes to conduct a vote among a group of voters (which act as the delegated user 506 as discussed above), where each voter may cast between 1 and N votes within a limited time period. This may be achieved using an Event Stream service and delegated authorisation tokens as follows:

1. The Vote master is responsible for creating and distributing a set of delegatedAuth tokens together with their delegatedAuth Index values—let's collectively call these 'Voter Authorisation Tokens' (VAT)—to a population of voters in advance of the opening of a voting period. Individual voters store their VAT for presentation at the time when their vote is cast.

2. Vote master creates an Event Stream to start and end at a particular time.

3. Voters may cast their vote(s) anytime within the voting period by calling the appendEvent endpoint. Votes must be presented along with a valid VAT.

4. Each vote will be authorised using the VAT and will be appended to the stream without using a sequenceNumber. The order of individual Events is typically unimportant. The stream may be configured to accept between 1 and N votes per VAT through use of the maximum writes as optionally provided during the creation of the Event Stream 5. At the end of the voting period, the Vote master will finalise the Event Stream and tally the votes using the queryData endpoint. An auditor may also use queryData using delegated read access to iterate through the votes, validating the Event data and verifying the on-chain stream state as needed.

Characteristics of this voting service include:

Voting is strictly limited to the population of voters who are in possession of a valid VAT.

The maximum number of votes per voter, is strictly limited by the Vote master in advance of the voting period.

The voting period is under the direct control of the Vote master, who may establish fixed start and end times when creating the stream.

The Event Stream service has no knowledge of the identity of voters, and so has no basis for favouring one vote over another (with the proviso that the voter's IP address could be known).

Votes will be recorded approximately in arrival time order.

The record of all votes is immutable and auditable as a result of Event Stream technology specifically and blockchain technology more generally. The event message itself may or may not be obfuscated (according to the rules set out by the Vote master), which will determine the practicality of a public audit.

Example configuration data used when creating the Event Stream:

```
"writeAccessControl" : {
    "maxWritesPerDelegate" : 4,
    "maxEventLength" : 100,
    "delegatedWriteH0" : 71625391653146580,
    "delegatedWriteIV" : 1878608923646284
},
"timeAccessControl" : {
    "openFrom" : "2020-10-25T20:00:00Z",
    "openUntil" : "2020-10-25T19:59:59Z"
}
```

The use of Event Stream and blockchain technology here advantageously provides a level of transparency not usually found in other "public" voting situations. The vote may be arranged so that any voter is able to see their own vote in the data set, and to calculate the outcome of the vote for themselves. The result of such a vote will be instantly available when vote data is stored in plain text but must wait for the Vote master to declare the result of a vote when vote data is obfuscated.

VAT Distribution

For a fair vote, VAT must be distributed to voters in advance of the opening of the voting period. VAT may be distributed in any manner that is practical for the use case. An example of this might be to distribute each VAT to a phone app. The VAT may or may not be associated with a registered user.

An alternative would be to hold the VAT in account data and provide the account user a web interface.

An alternative would be to connect a dial-up phone service to a driver that will translate calls and/or keypad input into vote data, and associate each one with a cache of VAT.

Each voter application will receive a VAT which comprises a delegated authorisation token called a $VAT_N$ and index N. Both the token and the index must be presented each time a vote is cast.

VAT Verification

Having been provided with WIV and WH0 when the Event Stream was created, the event service will anticipate calls to appendEvent, that include a $VAT_N$ and N, but not the normal client authentication data. The verification process is the same or similar to that as described above with reference to FIGS. 8 and 9A-D. If seen before, the service will accept, or reject a vote, depending on the configuration of the maximum number of votes per VAT, and the number of previous votes cast using $VAT_N$. If not seen before, the service must repeatedly hash $VAT_N$ N times, and then compare the final result with WH0. If these are equal, the vote is authorised and it will be recorded. For example; if N=3 the vote will be accepted if WH0 equals H(WIV∥H(WIV∥H(WIV∥H(WIV∥VAT3)))).

Vote Evaluation

It is preferably the sole responsibility of the Vote master to evaluate the votes and to determine the outcome.

Case 2—Equipment Activity Log

A high-end equipment manufacturer wishes to have access to important activity logs of its customers' equipment, may be as part of a warranty or service agreement. By analysing the logs, the manufacturer may be able to take proactive steps to ensure that the equipment is performing at peak efficiency. Delegated authorisation tokens can be factory fitted into the equipment allowing the equipment to automatically log important events during its lifetime—starting with registration.

In this case, the following would be recommended:

The manufacturer may configure an individual Event Stream for each product line.

Delegated authorisation tokens will be factory fitted into the equipment with the delegate index being recorded in the manufacturer's client database.

The equipment will automatically log important events during its lifetime-starting with registration.

The manufacturer is able to remotely monitor any activity including; heartbeat, runtime hours, change of critical components, use of qualified materials etc.

Example configuration data used when creating the Event Stream:

```
"settleStreamOnChain" : {
    "method" : "checkpoint",
},
"writeAccessControl" : {
    "maxEventLength" : 100,
    "delegatedWriteH0" : 71625391653146580,
    "delegatedWriteIV" : 1878608923646284
}
```

Case 3—Tender Process Via Bidding

Consider a local council that wishes to conduct an honest and open tender process. The council would issue tender documents clearly identifying the requirements and the basis of awarding a successful tender.

Suppose 20 companies register an intent to tender. The council must create delegated tokens for at least 20 elements and create an Event Stream to record the tenders. The 20 companies would each be given the token for use when submitting their tender document. The same or another token may also be provided to allow each company to read of all tenders once the tender period has closed.

The stream id ("esid" in the preceding examples) may be used in advance to check the stream's metadata, to ensure that the tender conditions are acceptable.

To ensure that the tender process is conducted without prejudice, the Event Stream can be configured as follows:

```
"settleStreamOnChain" : {
    "method" : "onEvent"
},
"writeAccessControl" : {
    "maxWritesPerDelegate" : 4,
    "delegatedWriteH0" : 878736456729829085,
    "delegatedWriteIV" : 66245284527845350
},
"readAccessControl" : {
    "delegatedReadH0" : 8932740872364807,
    "delegatedReadIV" : 557321466740,
    "readAfterFinalise" : true
},
"timeAccessControl" : {
    "openFrom" : "2021-10-10T00:00:00Z"
    "openUntil" : "2021-10-20T00:00:00Z"
}
```

Configuration Parameter Description:

| Parameter | Configuration effect |
| --- | --- |
| settleDataOnChain.method | The method onEvent indicates that each tender document will be recorded on-chain. The default value of settleDataOnChain is notarise, which will cause a digest of the tender document to be recorded, rather than the full document. |
| writeAccessControl.maxWritesPerDelegate | Sets the maximum number of times that each company may register a tender. |
| writeAccessControl.delegatedWriteH0 | Configures the stream for delegated write authorisation |
| writeAccessControl.delegatedWriteIV | Configures the stream for delegated write authorisation |
| readAccessControl.delegatedWriteH0 | Configures the stream for delegated read authorisation |
| readAccessControl.delegatedWriteIV | Configures the stream for delegated read authorisation |
| readAccessControl.readAfterFinalise | Prevents any data being read before the tender period is closed. |
| timeAccessControl.openFrom | Sets the start of the tendering period to midnight Oct. $10^{th}$ 2020 GMT. |
| timeAccessControl.openUntil | Sets the end of the tendering period to midnight Oct. $20^{th}$ 2020 GMT. |

With this configuration, companies who have received a delegatedAuth token will be able to register a tender document and revise it up to 3 times. Tenders will be accepted strictly within the designated period and no one will be able to view the bids until after the tender period has closed. Recording such tender information on the blockchain provides a way to publicly audit such a bidding process, thereby ensuring the overall process has been adhered to and thereby decrease the likelihood of a malicious actor interfering with the bidding process and overall increases the security of such a multi-party interaction.

Companies will also be able to monitor a digest of their bids on-chain, soon after each tender is submitted. Such digests act as a proof of existence thereby ensuring the content of a bid has not changed between submission and auditing. Advantageously allowing the existence of a bid to be recorded without showing what the bid was.

Case 4—Message Obfuscation

The need to obfuscate Event data (ED below) is use case dependent. For transparency and ease of public audit, plain text Event data is preferable. However, Event data may be so sensitive that it should not be revealed even to the service providing the Event Stream. In these cases, a client may dictate that Events be obfuscated in a way that will allow the Client to read each Event, but not others. A relatively simple method to achieve this is through a shared secret:

Along with the delegatedAuth token and index, the client also provides another random number IV (fIV below) to each contributor (i.e. a shared secret that should be kept private). This is to be used as an initial vector when encrypting the contributor's data.

Each contributor formats their own Event data ED according to the rules specified by the client.

ED is then encrypted using a common method such as AES. The contributor's individual iv is used so that ED can only be read by the contributor and the client.

The event message may then be constructed as follows: obfuscatedData=base64 (AES (ED, fIV))

Figure 13:
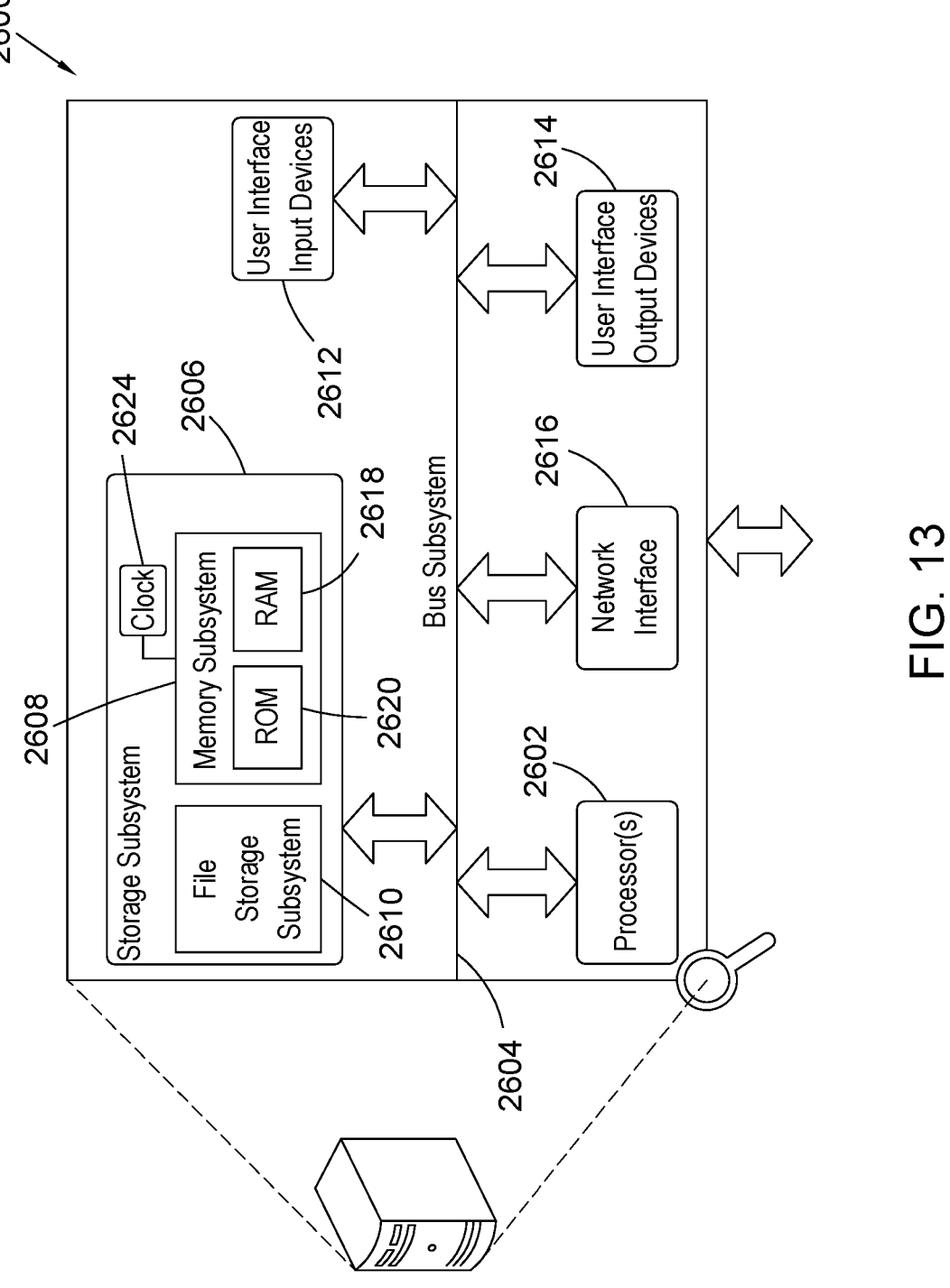
FIG. 13 is a schematic diagram, illustrating a computing environment in which various aspects and embodiments of the present disclosure can be implemented.

When the client wishes to evaluate the contributor's data, they may use queryData to obtain the Event record. This record contains the delegate's index, which may be used to find the contributor's id, and hence the shared secret iv. This may then be used to recover the plain text Event data from the obfuscated data element Platform Devices Turning now to FIG. 13, there is provided an illustrative, simplified block diagram of a computing device 2600 that may be used to practice at least one embodiment of the present disclosure. In various embodiments, the computing device 2600 may be used to implement any of the systems or methods illustrated and described above. For example, the computing device 2600 may be configured to be used as one or more components in the previously described system 500 of FIG. 5. The computing device 2600 may be configured to be a client entity that is associated with a given user; the client entity making database requests and/or submissions to the platform processor. The computing device 2600 may be configured to be a delegated user. The delegated user, upon reception of their delegated authorisation token may make data requests and/or submissions to the platform processor. Thus, computing device 2600 may be a portable computing device, a personal computer, or any electronic computing device. As shown in FIG. 13, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended.

Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 13 is intended only as a specific example for purposes of illustrating the preferred embodiment of the device. Many other configurations having more or fewer components than the system depicted in FIG. 13 are possible.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" or "hardware module" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" or "hardware module" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "determining", "providing", "calculating", "computing," "identifying", "combining", "establishing", "sending", "receiving", "storing", "estimating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

The singular reference of an element does not exclude the plural reference of such elements and vice-versa.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer implemented method comprising:
obtaining a predetermined value,
receiving a request, the request comprising a first delegated authorisation token of a chain of delegated authorisation tokens,
generating further delegated authorisation tokens of the chain of delegated authorisation tokens, wherein the generation of each further delegated authorisation token in the chain of delegated authorisation tokens is based on a preceding delegated authorisation token in the chain of delegated authorisation tokens, comprises the steps of:
determining an intermediate preimage, the intermediate preimage being based on the preceding delegated authorisation token in the chain of delegated authorisation tokens; and
applying a one-way function to the intermediate preimage, the output to the one-way function being the further delegated authorisation token, and
determining a validity of the first delegated authorisation token based on a comparison of one of the delegated authorisation tokens in the chain of delegated authorisation tokens and the predetermined value.

2. The computer implemented method according to claim 1, wherein the generation is based on hashing the preceding delegated authorisation token in the chain of delegated authorisation tokens.

3. The computer implemented method according to claim 1, wherein the generation of further delegated authorisation tokens is based on the preceding delegated authorisation token in the chain of delegated authorisation tokens and a given value.

4. The computer implemented method according to claim 3, wherein the given value was received from a client.

5. The computer implemented method according to claim 3, wherein generation is based on a concatenation of the given value and the preceding delegated authorisation token.

6. The computer implemented method according to claim 5, wherein the generation is based on hashing the concatenation of the given value and the preceding delegated authorisation token in the chain of delegated authorisation tokens.

7. The computer implemented method according to claim 1, wherein the request further comprises an index number and a number of delegated authorisation tokens in the chain of delegated authorisation tokens is based on the index number.

8. The computer implemented method according to claim 7 wherein the step of determining a validity of the first delegated authorisation token is based on a comparison of a final delegated authorisation tokens in the chain of delegated authorisation tokens and the predetermined value.

9. The computer implemented method according to claim 7, further comprising the steps of:
storing the chain of delegated authorisation tokens,
receiving a further request comprising a further delegated authorisation token,
determining a validity of the further delegated authorisation token based whether the further delegated authorisation token is present in the stored chain of delegated authorisation tokens, and
processing the further request based on the validity of the further delegated authorisation token.

10. A computer implemented method for generating a chain of delegated authorisation tokens associated comprising:
obtaining a first value and a second value,
generating a first delegated authorisation token of the chain of delegated authorisation tokens, the first delegated authorisation token is based on the first value and the second value, and
generating at least one further delegated authorisation token of the chain of delegated authorisation tokens, wherein the generation of each further delegated authorisation token in the chain of delegated authorisation tokens comprises the steps of:
determining an intermediate preimage, the intermediate preimage being based on the preceding delegated authorisation token in the chain of delegated authorisation tokens and the first value, and
applying a one-way function to the intermediate preimage, the output to the one-way function being the further delegated authorisation token.

11. The computer implemented method according to claim 10, wherein generation is based on a concatenation of the first value and the preceding delegated authorisation token.

12. The computer implemented method according to claim 11, wherein the generation is based on hashing the concatenation of a given value and the preceding delegated authorisation token in the chain of delegated authorisation tokens.

13. The computer implemented method according to claim 10, further comprising the step of:

providing the first value and a final delegated authorisation token of the chain of delegate authorisation tokens to a verification device.

14. The computer implemented method according to claim 10, wherein a number of delegated authorisation tokens in the chain of delegated authorisation tokens is based on the number of delegates.

15. The computer implemented method according to claim 10, wherein the preceding delegated authorisation token refers to the delegated authorisation token immediately preceding the delegated authorisation token being generated.

16. A system comprising:

a server, a delegate, and a client configured to:

generate a chain of delegated authorisation tokens and a first value by:

obtaining a first value and a second value;

generating a first delegated authorisation token of the chain of delegated authorisation tokens, the first delegated authorisation token is based on the first value and the second value; and generating at least one further delegated authorisation token of the chain of delegated authorisation tokens, wherein the generation of each further delegated authorisation token in the chain of delegated authorisation tokens comprises the steps of:

determining an intermediate preimage, the intermediate preimage being based on the preceding delegated authorisation token in the chain of delegated authorisation tokens and the first value, and applying a one-way function to the intermediate preimage, the output to the one-way function being the further delegated authorisation token, transmit the first value and a final delegated authorisation token of the chain of delegated authorisation tokens to the server, and transmit one of the delegated authorisation tokens in the chain of delegated authorisation tokens to the delegate.

17. The system according to claim 16, wherein the server is configured to:

receive and process a request from the delegate by:

obtaining a predetermined value, receiving a request, the request comprising a first delegated authorisation token of a chain of delegated authorisation tokens, generating further delegated authorisation tokens of the chain of delegated authorisation tokens, wherein the generation of each further delegated authorisation token in the chain of delegated authorisation tokens is based on a preceding delegated authorisation token in the chain of delegated authorisation tokens, determining a validity of the first delegated authorisation token based on a comparison of one of the delegated authorisation tokens in the chain of delegated authorisation tokens and the predetermined value.

* * * * *